US012749808B2

(12) United States Patent
Berg et al.

(10) Patent No.: US 12,749,808 B2
(45) Date of Patent: Sep. 29, 2026

(54) METHOD AND TRANSMITTER OF A WIRELESS COMMUNICATION NETWORK FOR ANALOG BEAMFORMING

(71) Applicant: Telefonaktiebolaget LM Ericsson (publ), Stockholm (SE)

(72) Inventors: Miguel Berg, Sollentuna (SE); Tomas Andreason, Tyresö (SE); Leonard Rexberg, Hässelby (SE); Örjan Renström, Spånga (SE); Sten Wallin, Enskede (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 926 days.

(21) Appl. No.: 17/916,493

(22) PCT Filed: Dec. 4, 2020

(86) PCT No.: PCT/SE2020/051166
§ 371 (c)(1),
(2) Date: Sep. 30, 2022

(87) PCT Pub. No.: WO2021/201737
PCT Pub. Date: Oct. 7, 2021

(65) Prior Publication Data

US 2023/0198588 A1 Jun. 22, 2023

(30) Foreign Application Priority Data

Apr. 2, 2020 (WO) ................. PCT/SE2020/050345

(51) Int. Cl.
*H01Q 3/30* (2006.01)
*H01Q 3/36* (2006.01)
(Continued)

(52) U.S. Cl.
CPC ................ *H01Q 3/30* (2013.01); *H01Q 3/36* (2013.01); *H04B 7/0617* (2013.01);
(Continued)

(58) Field of Classification Search
CPC . H01Q 3/30; H01Q 3/36; H01Q 1/246; H04B 7/0617; H04B 7/0634; H04B 7/0682
See application file for complete search history.

(56) References Cited

U.S. PATENT DOCUMENTS 4,231,040 A 10/1980 Walker
6,340,948 B1 1/2002 Munoz-Garcia et al.
(Continued)

FOREIGN PATENT DOCUMENTS

CN 1148907 A 4/1997
CN 1753550 A 3/2006
(Continued)

OTHER PUBLICATIONS

Bogale, T. E. et al., "On the Number of RF Chains and Phase Shifters, and Scheduling Design With Hybrid Analog-Digital Beamforming", IEEE Transactions on Wireless Communications, vol. 15, No. 5, May 2016 (pp. 3311-3326).
(Continued)

*Primary Examiner* — Faruk Hamza
*Assistant Examiner* — Tito Q Pham
(74) *Attorney, Agent, or Firm* — Rothwell, Figg, Ernst & Manbeck, P.C.

(57) ABSTRACT

Disclosed is a method for analog beamforming performed by a transmitter (110) of a wireless communication network (100). The transmitter (110) comprises a plurality of antenna branches (114, 115, 116), each antenna branch comprising an antenna element (111, 112, 113). The method comprises, for each antenna branch (114, 115, 116), obtaining a first and a second signal of an analog radio signal, the first and the
(Continued)

second signal being split from the analog radio signal and the analog radio signal being the same at each of the antenna branches, and obtaining information indicating a branch-specific phase-shift angle and a branch-specific amplitude determined from information identifying a radiation pattern comprising at least two directions for wireless transmission to at least one receiver (120). The method further comprises phase-shifting the first signal according to a first phase-shift angle and the second signal according to a second phase-shift angle, the first and the second phase-shift angle being selected so that when the first and the second signals are combined, the combined signal has the branch-specific phase-shift angle and the branch-specific amplitude indicated by the obtained information, combining the phase-shifted first and second signals into a combined signal; and transmitting, wirelessly, the combined signal through the antenna element (111, 112, 113).

17 Claims, 11 Drawing Sheets

(51) Int. Cl.
*H04B 7/06* (2006.01)
*H01Q 1/24* (2006.01)

(52) U.S. Cl.
CPC ......... *H04B 7/0634* (2013.01); *H04B 7/0682* (2013.01); *H01Q 1/246* (2013.01)

(56) References Cited

U.S. PATENT DOCUMENTS

| | | | |
|---|---|---|---|
| 6,404,404 | B1 | 6/2002 | Chen et al. |
| 7,400,296 | B2 | 7/2008 | Haskell |
| 9,705,611 | B1 | 7/2017 | West |
| 10,141,993 | B2 | 11/2018 | Lee et al. |
| 11,218,203 | B1 * | 1/2022 | Lee ...................... H04B 7/0617 |
| 11,791,567 | B2 | 10/2023 | Corman |
| 2005/0206475 | A1 | 9/2005 | Strull |
| 2008/0132180 | A1 | 6/2008 | Manicone |
| 2010/0261440 | A1 | 10/2010 | Corman |
| 2012/0190316 | A1 | 7/2012 | Martineay |
| 2014/0049337 | A1 | 2/2014 | Schmidhammer |
| 2014/0097986 | A1 | 4/2014 | Xue et al. |
| 2014/0185481 | A1 | 7/2014 | Seol et al. |
| 2014/0266901 | A1 | 9/2014 | Klemes |
| 2016/0329935 | A1 | 11/2016 | Singerl et al. |
| 2017/0085362 | A1 | 3/2017 | Alpert et al. |
| 2017/0229774 | A1 | 8/2017 | Schuehler et al. |
| 2018/0279134 | A1 | 9/2018 | Malik et al. |
| 2019/0252755 | A1 | 8/2019 | Shamsinejad et al. |
| 2019/0326662 | A1 | 10/2019 | Zimmerman et al. |
| 2020/0006849 | A1 | 1/2020 | Zhu et al. |
| 2020/0287608 | A1 | 9/2020 | Trojer et al. |
| 2021/0210870 | A1 * | 7/2021 | Tzadok ................ H01Q 21/061 |
| 2022/0060231 | A1 * | 2/2022 | Jaldén ................. H04L 25/0202 |
| 2023/0048770 | A1 | 2/2023 | Brown |
| 2024/0039155 | A1 | 2/2024 | Jayamon |
| 2024/0097729 | A1 | 3/2024 | Adnan |

FOREIGN PATENT DOCUMENTS

| | | | |
|---|---|---|---|
| CN | 107230842 | A | 10/2017 |
| CN | 107528617 | A | 12/2017 |
| CN | 108802668 | A | 11/2018 |
| CN | 110495109 | A | 11/2019 |
| EP | 2584651 | A1 | 4/2013 |
| EP | 2675080 | A1 | 12/2013 |
| JP | 2010-511353 | A | 4/2010 |
| JP | 2013-187578 | A | 9/2013 |
| KR | 10-2009-0086117 | A | 8/2009 |
| KR | 10-2014-0010964 | A | 1/2014 |
| KR | 10-2016-0130947 | A | 11/2016 |
| WO | 2018/119153 | A2 | 6/2018 |
| WO | 2019/098897 | A1 | 5/2019 |
| WO | 2019154423 | A1 | 8/2019 |
| WO | 2019/195426 | A1 | 10/2019 |
| WO | 2019/223865 | A1 | 11/2019 |
| WO | 2021/048551 | A1 | 3/2021 |

OTHER PUBLICATIONS

Mishra, D. et al., "Efficacy of Hybrid Energy Beamforming With Phase Shifter Impairments and Channel Estimation Errors", IEEE Signal Processing Letter, vol. 26, No. 1, Jan. 2019 (5 pages).
Xie, J.,"Research of Key Technologies of Beamforming for Millimeter Wave Wireless Communication" (Jan. 15, 2021) (104 pages).
International Search Report and Written Opinion dated Apr. 30, 2021 in International Application No. PCT/SE2020/051166 (10 pages).
International Search Report and Written Opinion dated Feb. 3, 2021 in International Application No. PCT/SE2020/050345 (9 pages).
Ericsson, "Ericsson and industry partners advance 5G commercial readiness in North America", Press Release Sep. 11, 2018 (3 pages).
Non-Final Office Action issued in U.S. Appl. No. 17/915,910 dated Sep. 26, 2025 (9 pages).

* cited by examiner

METHOD AND TRANSMITTER OF A WIRELESS COMMUNICATION NETWORK FOR ANALOG BEAMFORMING

CROSS REFERENCE TO RELATED APPLICATIONS

This application is a 35 U.S.C. § 371 National Stage of International Patent Application No. PCT/SE2020/051166, filed on Dec. 4, 2020, which claims priority to International Patent Application No. PCT/SE2020/050345, filed Apr. 2, 2020, which is incorporated by this reference.

TECHNICAL FIELD

The present disclosure relates generally to methods and transmitters for analog beam steering of wireless signals to be transmitted from the transmitters towards receivers in a wireless communication network. The present disclosure further relates to computer programs and carriers corresponding to the above methods and transmitters.

BACKGROUND

For the 5$^{th}$ Generation (5G) wireless communication networks radio technology called New Radio (NR) the transmitters, e.g. base stations have advanced aka active or adaptive antenna systems (AAS) working in high frequencies, i.e. short wavelengths, such a millimeter wave (mmW) bands. Such AAS typically perform beamforming, aka beam steering by analog time-domain phase shifting per antenna branch. Carrier bandwidths can be several hundred megahertz and one AAS can contain e.g. 256 or even more antennas branches.

Beamforming signifies to direct a resulting signal transmitted wirelessly from antenna elements of the transmitter into requested geographical directions towards receivers. Full frequency-domain beamforming (BF), as used for lower frequency bands in both Long Term Evolution (LTE), i.e. 4G wireless communication networks and NR, is more flexible than time-domain BF. However, full frequency-domain BF is too complicated for mmW bands given the large number of antenna branches since each antenna branch needs its own Fast Fourier Transform (FFT)/Inverse FFT (IFFT) calculation unit. As opposed to frequency domain BF, time-domain BF does not require separate FFT/IFFT per antenna branch as FFT/IFFT is performed in common for all antenna branches. Thus, complexity of the transmitter is significantly reduced.

Further complexity reduction for time-domain BF is possible by performing analog BF instead of digital BF. This is true since the wide bandwidth and large number of antenna branches for AAS require high clock frequencies and many parallel operations in each antenna branch such as filtering, analog-to-digital and digital-to-analog conversion etc. if digital processing is used. This can be avoided by analog BF as in analog BF those operations are performed in common for all branches. Consequently, for the AAS working in high frequencies and with a large amount of antenna branches, it is beneficial to use time-domain analog BF.

In time-domain analog BF, the same signal is distributed in time-domain into all the antenna branches of the transmitter. By only adjusting the phase of the signal at the individual antenna branches, hereinafter called phase-only BF, a single "pencil beam", i.e. a narrow, sharp beam with a rather high amplitude, can be created by the wirelessly transmitted resulting signal, resulting from the simultaneous transmission of signals from the individual antenna branches. A pencil beam is adapted to a plane wave, having linear phase progression over the antenna elements. Such a pencil beam is very convenient when there is only one receiver to receive the resulting wirelessly transmitted signal. When it is needed to transmit a resulting signal with a more complicated beam, for example due to multiple receivers situated at different directions from the transmitter, phase-only BF can provide decent multiple pencil beams directed towards the receivers, however to the cost of high sidelobes and low signal-to-noise ratio (SNR). Consequently, in order to get good performance, i.e. beams directed towards the receivers to receive the signal and at the same time having low sidelobes and high SNR, both amplitude and phase control would be needed at the antenna branches. However, when using analog beamforming for example at mmW bands, amplitude control via attenuators or variable-gain amplifiers has been shown to have insufficient accuracy and is seldom used. Phase shifting, on the other hand, can be done with high accuracy and is therefore the preferred beamforming method for mmW bands. But, as shown above, due to the problem of high sidelobes with shaped beams, phase-only BF is often restricted to simple beams such as one pencil beam. For wideband carriers, such beams can waste a lot of capacity since only one user, receiving via its wireless device, may be scheduled at each instant in time even if that user's bitrate requirement is small. Further, in rich-scattering environments where the signal from a single user arrives to the base station from multiple directions, SNR may be degraded substantially if a single pencil beam is used. Therefore, it is desired to use more complicated beam shapes, from here on called shaped beams.

Phase-only BF uses constant (maximum) weight on all antenna branches and can therefore yield higher BF gain, in terms of received or transmitted signal power, than time-domain analog BF using both amplitude and phase control, but the higher gain at a receiver will also amplify noise and interference for antenna branches where the amplitude of the received signal is low, which results in the above mentioned SNR degradation. Further, as mentioned, and as shown in FIG. 1, if phase-only BF is used to create shaped beams, unwanted sidelobes may become very strong compared to the case with beamforming using both amplitude and phase. Such sidelobes are unwanted since they will increase interference from other users in uplink and to other users in downlink, which leads to a degradation in Signal to Interference and Noise Ratio (SINR) and system throughput. As seen in FIG. 1, sidelobes are lower for the pencil beam case than for phase-only BF into the three user-signal directions but still much higher than for BF using both amplitude and phase. Further, for pencil-beam BF, one must choose a single pointing direction, although in this example the desired signal energy has three different directions, see user-signal directions in FIG. 1. If the three directions correspond to different users, a pencil beam cannot be used to communicate with more than one of the users for a given time interval, which may waste capacity if the user does not have enough data to fill all resource blocks.

As shown above, there is a need for a method and transmitter that can perform time-domain analog beamforming where simultaneous beams can be formed into multiple directions at the same time as SNR is kept high.

SUMMARY

It is an object of the invention to address at least some of the problems and issues outlined above. It is possible to achieve these objects and others by using methods, and transmitters as defined in the attached independent claims.

According to one aspect, a method for analog beamforming is provided, which is performed by a transmitter of a wireless communication network. The transmitter comprises a plurality of antenna branches, each antenna branch comprising an antenna element. The method comprises, for each antenna branch, obtaining a first and a second signal of an analog radio signal, the first and the second signal being split from the analog radio signal and the analog radio signal being the same at each of the antenna branches, and obtaining information indicating a branch-specific phase-shift angle and a branch-specific amplitude determined from information identifying a radiation pattern comprising at least two directions for wireless transmission to at least one receiver. The method further comprises phase-shifting the first signal according to a first phase-shift angle and the second signal according to a second phase-shift angle, the first and the second phase-shift angle being selected so that when the first and the second signals are combined, the combined signal has the branch-specific phase-shift angle and the branch-specific amplitude indicated by the obtained information, combining the phase-shifted first and second signals into a combined signal; and transmitting, wirelessly, the combined signal through the antenna element.

According to another aspect, a transmitter operable in a wireless communication network is provided, the transmitter being configured for analog beamforming. The transmitter comprises a plurality of antenna branches, each antenna branch comprising an antenna element. The transmitter also comprises a processing circuitry and a memory. The memory contains instructions executable by said processing circuitry, whereby the transmitter is operative for, for each antenna branch, obtaining a first and a second signal of an analog radio signal, the first and the second signal being split from the analog radio signal and the analog radio signal being the same at each of the antenna branches, and obtaining information indicating a branch-specific phase-shift angle and a branch-specific amplitude determined from information identifying a radiation pattern comprising at least two directions for wireless transmission to at least one receiver. The transmitter is further operative for, for each antenna branch, phase-shifting the first signal according to a first phase-shift angle and the second signal according to a second phase-shift angle, the first and the second phase-shift angle being selected so that when the first and the second signals are combined, the combined signal has the branch-specific phase-shift angle and the branch-specific amplitude indicated by the obtained information, combining the phase-shifted first and second signals into a combined signal, and transmitting, wirelessly, the combined signal through the antenna element.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIG. 8 is a block diagram illustrating a node in more detail, according to further possible embodiments.

DETAILED DESCRIPTION

Figure 2:
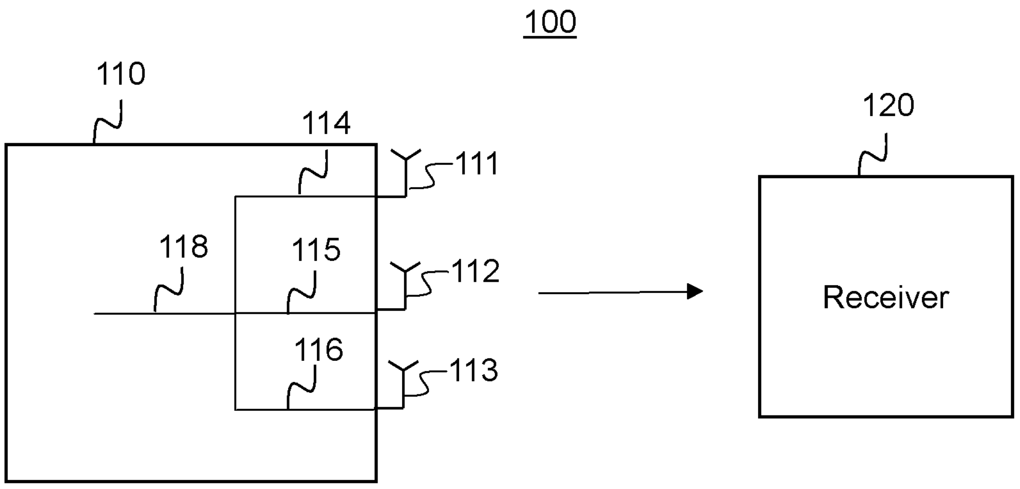
FIG. 2 is a schematic block diagram illustrating a wireless communication network in which the present invention may be used.

FIG. 2 shows a wireless communication network 100 in which the present invention may be used. The wireless communication network comprises a transmitter 110 that is in communication with, or adapted for wireless communication with a receiver 120. The transmitter 110 has a plurality of antenna elements 111, 112, 113. An analog time-domain signal arrives at line 118. The line 118 is split into a plurality of antenna branches 114, 115, 116, which each end in at least one of the plurality of antenna elements 111, 112, 113. The antenna elements of different branches 114, 115, 116 are individually steerable. However, in case there are more than one antenna element on one antenna branch, those antenna elements on the same branch are not mutually individually steerable. The analog time-domain signal arriving at line 118 is split into the plurality of antenna branches 114, 115, 116, and the analog signal is transmitted wirelessly from each of the antenna elements 111, 112, 113 towards the receiver 120. In other words, the same analog signal is sent into each of the antennas branches 114, 115, 116. In such a transmitter, the combined signal transmitted wirelessly can be steered using analog beamforming at the individual antenna branches. In this disclosure it will be shown an inventive way for phase shifting the analog signals in the different antenna branches in order to achieve both amplitude and phase time-domain analog beamforming.

Figure 3:
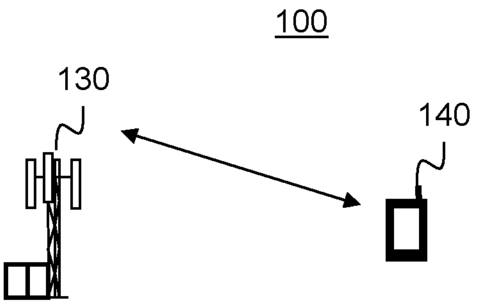
FIG. 3 is a schematic figure of a wireless communication network in which the present invention may be used, the network comprising a base station and a wireless device.

FIG. 3 shows an example of a wireless communication network 100 in which the present invention may be used. The network 100 comprises a radio access network node 130 that is in, or is adapted for, wireless communication with a wireless communication device 140. The transmitter 110 of FIG. 2 may be the radio access network node 130 and the receiver 120 of FIG. 2 may be the wireless communication device 140. Alternatively, the transmitter 110 of FIG. 2 may be the wireless communication device 140 and the receiver 120 may be the radio access network node 130.

The wireless communication network 100 of FIGS. 2 and 3 may be any kind of wireless communication network that can provide radio access to wireless devices. Example of such wireless communication networks are Long Term Evolution (LTE), LTE Advanced, Wireless Local Area Networks (WLAN), fifth generation wireless communication networks based on technology such as New Radio (NR), and any possible future 6$^{th}$ Generation wireless communication networks.

The RAN node 130 may be any kind of network node that provides wireless access to a wireless device 140 alone or in combination with another network node. Examples of radio access network nodes 130 are a base station (BS), a radio BS, a base transceiver station, a BS controller, a network controller, a Node B (NB), an evolved Node B (eNB), a gNodeB (gNB), a Multi-cell/multicast Coordination Entity, a relay node, an access point (AP), a radio AP, a remote radio unit (RRU), a remote radio head (RRH) and a multi-standard BS (MSR BS).

The wireless device 140 may be any type of device capable of wirelessly communicating with a RAN node 130 using radio signals. For example, the wireless device 140 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 4:
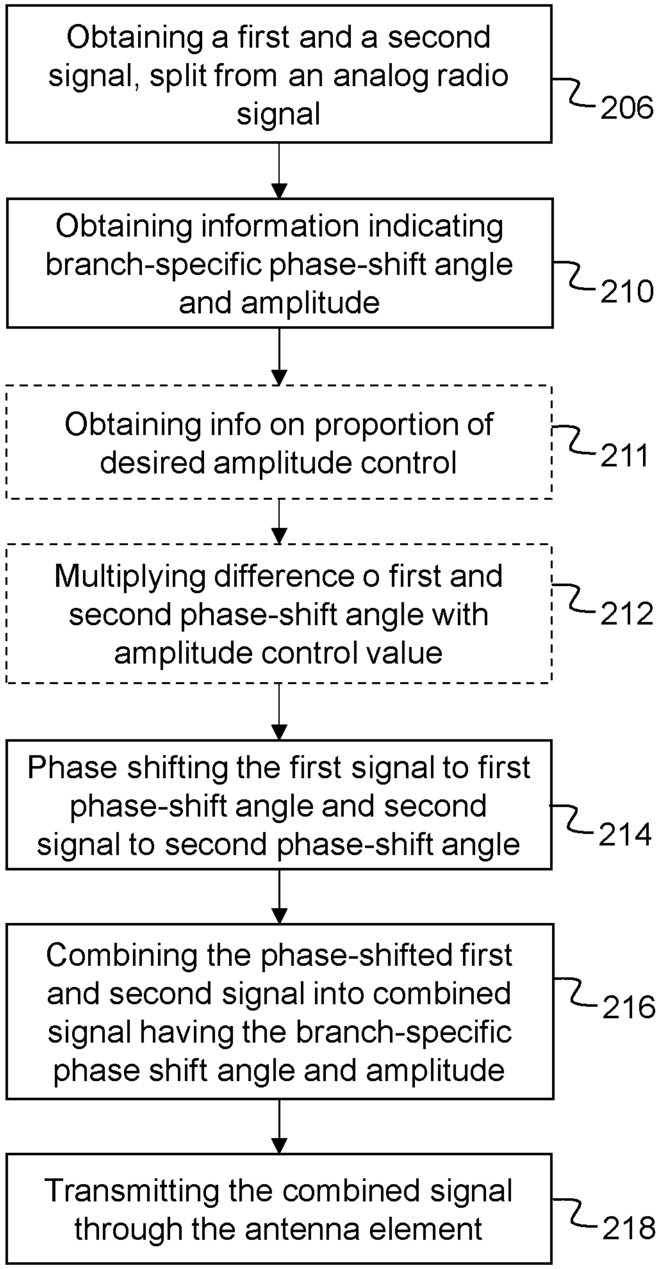
FIG. 4 is a flow chart illustrating a method performed by a transmitter, according to possible embodiments.

FIG. 4, in conjunction with FIG. 2, describes a method for analog beamforming performed by a transmitter 110 of a wireless communication network 100. The transmitter 110 comprises a plurality of antenna branches 114, 115, 116, each antenna branch comprising an antenna element 111, 112, 113. The method comprises, for each antenna branch 114, 115, 116, obtaining 206 a first and a second signal of an analog radio signal, the first and the second signal being split from the analog radio signal and the analog radio signal being the same at each of the antenna branches, and obtaining 210 information indicating a branch-specific phase-shift angle and a branch-specific amplitude determined from information identifying a radiation pattern comprising at least two directions for wireless transmission to at least one receiver 120. The method further comprises phase-shifting 214 the first signal according to a first phase-shift angle and the second signal according to a second phase-shift angle, the first and the second phase-shift angle being selected so that when the first and the second signals are combined, the combined signal has the branch-specific phase-shift angle and the branch-specific amplitude indicated by the obtained information, combining 216 the phase-shifted first and second signals into a combined signal; and transmitting 218, wirelessly, the combined signal through the antenna element 111, 112, 113.

In order to achieve phase and amplitude beamforming, the first and the second phase-shift angles are different angles. When the first and the second signal have the same amplitude, the first and the second phase-shift angles are positioned so that they have the same angular distance to the combined signal, but on opposite sides of the combined signal. In other words, the phase angle of the combined signal is the average of the phase angles of the first and second signals, and one of the phase angles of the first and the second signal is greater than the phase angle of the combined signal by the same amount that the phase angle of the other of the first and the second signal is smaller. By spreading the phase-shifted first and second signal more or less apart from each other, the combined signal will get different amplitudes. Further, the spreading is performed so that when the first and second signals are combined, the combined signal will get the branch-specific phase-shift angle. In other words, the angular difference between the first and the second signal, i.e. the difference between the first and the second phase-shift angle, is changed depending on the branch-specific amplitude that is wanted. Hereby, the amplitude of the combined signal can be selected according to the information on branch-specific amplitude. As a result, amplitude and phase beamforming can be achieved with a small amount of extra equipment in the transmitter, i.e. one signal splitter, two phase shifters instead of one, and one signal combiner in each antenna branch, compared to prior art analog phase-only beamforming, or even only one additional signal splitter splitting the incoming analog radio signal. Further, with such phase and amplitude beamforming, sidelobes will be largely reduced which results in a largely reduced interference, compared to phase-only beamforming. Also, multiple users, i.e. receivers e.g. wireless devices, can be scheduled in different directions simultaneously, i.e. within the same symbol. This may be used so that a first user uses a part of the spectrum and a second user uses another part of the spectrum, even if the same information is sent to both users. Further, compared to using separate amplifiers to control amplitude, the accuracy with the above method only using phase shifters is higher.

The transmitter 110 may be a base station 130 or a part of a base station, and the at least one receiver 120 may be a wireless device 140 or a part of a wireless device. Alternatively, the transmitter 110 may be a wireless device 140 or a part of a wireless device, and the at least one receiver 120 may be a base station 130 or a part of a base station. An antenna branch is a signal branch, i.e. a current-conducting wire or wires where each antenna branch receives an analog version of a radio signal to be transmitted. Each antenna branch leads to one or more antenna elements where the analog radio signal is wirelessly transmitted. The antenna branches are electrically arranged in parallel. The different versions of the analog radio signal may be treated differently on different antenna branches. An antenna element is the part of the antenna from which signals are sent and received. There may be only one antenna element per antenna branch, or there may be more than one antenna element in one branch, for example a sub-array of antenna elements. The antenna branches are individually controllable. That is, the antenna elements of different antenna branches are individually controllable, whereas in case there are more than one antenna element in the same antenna branch, those antenna elements of the same antenna branch are not necessarily individually controllable. This means that it is possible to control an antenna element of one antenna branch in a different way than an antenna element of another antenna branch. The first and second signal may have the same amplitude, which corresponds to half the signal power of the analog radio signal coming to one antenna branch. According to another embodiment, the first and second signal may have different amplitudes. In such case, adjustment of the amplitude of the combined signal is still possible, but the available adjustment range will be smaller compared to using the same amplitude. The splitting of the received radio signal may be achieved at each antenna branch or the analog radio signal may be split centrally and the first and second signal of the analog radio signal may be fed to each of the antenna branches. The obtaining of information indicating branch-specific phase-shift angle and amplitude may be made in a time magnitude of per symbol or per slot. I.e. branch-specific phase-shift angle and amplitude are used for a time period of approximately a symbol or a slot before they may be changed again.

The information identifying a radiation pattern comprising at least two directions for wireless transmission to at least one receiver may be determined by the transmitter based on channel state information. Alternatively, the transmitter just receives information that transmission is to be performed in the at least two directions. Further, the at least two directions refer to the main transmission lobes and not the side lobes. Based on the channel state information or the transmission direction information directly, individual beam weights are calculated for each antenna branch, or alternatively determined from a look-up table with predetermined beam weights specific for the transmitter in order to achieve the at least two transmission directions in question. The individual beam weights for each antenna branch are selected so that the combined wireless transmitted signal from all antenna branches identify a desired radiation pattern with the at least two directions for wireless transmission. The individual beam weights are here selected so that they indicate a branch-specific phase-shift angle and a branch-specific amplitude. In other words, the individual beam weights comprise the branch-specific phase-shift angle and amplitude.

According to an embodiment, to split the signal of individual antenna branches into two signals aka sub-branches, and have one phase shifter in each sub-branch can also be used to create a radiation pattern having only a single direction, though in this case the advantage over single phase shifter designs is smaller. The possibility of amplitude adjustment in the dual phase shifter setup could nevertheless be used e.g. for amplitude tapering, to reduce side lobes.

Figure 5:
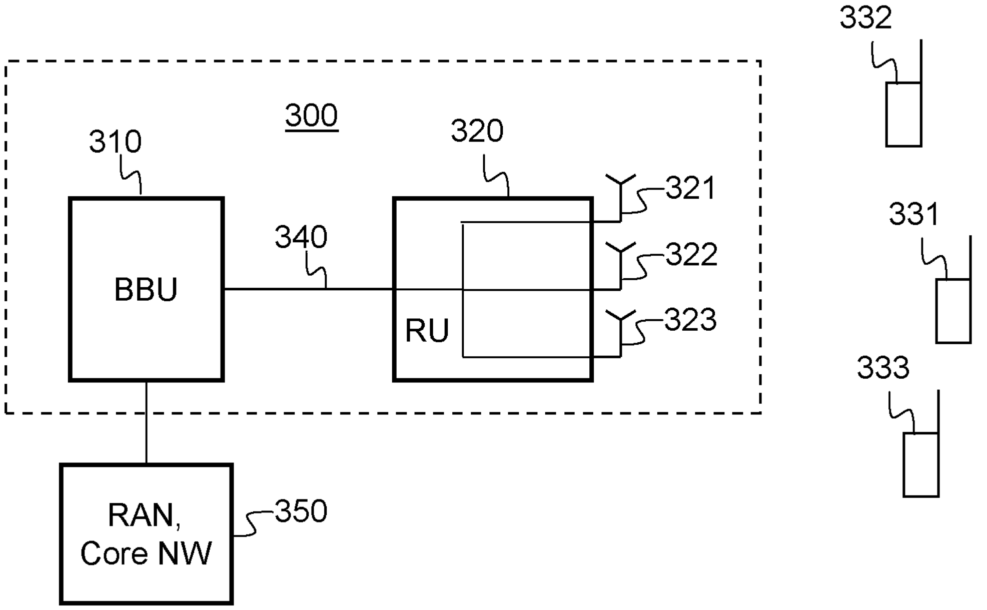
FIG. 5 is a schematic block diagram illustrating another wireless communication network in which the present invention may be used.

FIG. 5 shows a wireless communication network with a distributed base station system 300 comprising a baseband unit, BBU 310, and a radio unit, RU 320, interconnected via a fronthaul connection 340. The RU 320 has a plurality of antenna branches each comprising an antenna element 321, 322, 323. The RU 320 is arranged to transmit wireless signals to, and receive from, wireless devices 331, 332, 333. According to an embodiment, the BBU 310 is connected to other RAN nodes and a core network 350.

According to an embodiment of the method shown in FIG. 4, the RU 320 of FIG. 5 is the transmitter 110, and one or more of the wireless devices 331, 332, 333 is the at least one receiver 120. Further, the RU 320 is arranged to perform the method described in FIG. 4.

In the following, a number of embodiments are provided, in which different alternatives of how to split steps of the method of FIG. 4 between the RU 320 and the BBU 310. According to a first embodiment, the obtaining 210 of information indicating a branch-specific phase-shift angle and a branch-specific amplitude comprises the RU 320 performing the following steps: obtaining an estimation of a wireless communication channel between the RU 320 and the one or more of the wireless devices 331, 332, 333; determining branch-specific beam weights for each antenna branch based on the estimation of the wireless communication channel; and calculating the first phase-shift angle and the second phase-shift angle for each antenna branch based on the calculated branch-specific beam weights. In this embodiment, the RU may either perform the obtaining of an estimation of the wireless communication channel itself based on Channel State Information (CSI) received from the one or more wireless devices, or the RU may obtain the estimation of the wireless communication channel by receiving the estimation of the wireless communication channel from the BBU Such a method would require lots of computations in the RU, but no or little information indicating the branch-specific phase-shift setting and the branch-specific amplitude setting needs to be sent over the fronthaul connection, and consequently, fronthaul connection capacity is saved. The estimation of the wireless communication channel may be Channel State Information acquired from measurements the RU performs on reference signals sent from the one or more wireless device towards the RU or from measurements on reference signals sent from the RU to the one or more wireless device. In the latter, the one or more wireless device sends the performed measurements, possibly as CSI, towards the RU, and possibly further to the BBU.

According to another embodiment, the obtaining 210 of information indicating a branch-specific phase-shift angle and a branch-specific amplitude comprises the RU 320 performing the following steps: receiving, from the BBU 310 over the fronthaul connection 340, a beamspace representation of an estimation of a wireless communication channel between the RU 320 and the one or more wireless device 331, 332, 333; determining branch-specific beam weights for each antenna branch based on the received beamspace representation, and calculating the first phase-shift angle and the second phase-shift angle for each antenna branch based on the determined branch-specific beam weights. A beamspace representation requires a beam index identifying each active beam and an optional beam weight for each active beam, which may be complex. Alternatively, the beamspace representation requires a bit mask indicating the active beams and an optional beam weight for each active beam according to the bit mask. For a small number of active beams, i.e. pencil beams, it may be most efficient to send the beam indices, and for a large number of active beams it may be most efficient to send the bit mask. Alternatively, individual beam weights are sent for all possible beams and the beam weights are set to 0 for all beams that are not active, but such an alternative would result in unnecessary much data to be sent. In other words, a beamspace representation may refer to a combination of pencil beams or as a number of beams with attribute, as opposed to antenna branch space where values are given per antenna branch. By using beamspace representation, a set of so-called pencil beams, i.e. single beams from e.g. a code book are combined to determine beam weights per branch. By the BBU, or any other node or combination of nodes higher up in the network, calculating the beamspace representations and sending the beamspace representations to the RU over the fronthaul connection, less computations may be necessary to perform in the RU compared to in the above case, depending on used beamforming method in the RU, but the beamspace representations need to be sent in some form over the fronthaul connection, which take up some fronthaul connection capacity. However, when the beamspace representations are realized as code book indications, only the codebook indications need to be sent over the fronthaul connection, which does not take much fronthaul capacity into consideration.

According to another embodiment, the obtaining 210 of information indicating a branch-specific phase-shift angle and a branch-specific amplitude comprises the RU 320 performing the following steps: receiving, from the BBU 310 over the fronthaul connection 340, beam attributes determined from an estimation of a wireless communication channel between the RU (320) and the one or more wireless device 331, 332, 333; determining branch-specific beam weights based on the received beam attributes, and calculating the first phase-shift angle and the second phase-shift angle based on the determined branch-specific beam weights. Beam attributes may be a list of pointing directions and beam widths in azimuth and elevation direction. This determining in the RU may include table look-up in the RU to find the beam weight per antenna branch for each beam. This is effective in terms of fronthaul connection usage and computation-wise in the RU, especially when the shaped resultant beam can be described as a combination of a small number of wide beams or beams with specific properties. Further, an advantage over beamspace representation is that the resolution of e.g. beamwidth, and the information sent over the fronthaul connection are not dependent on a codebook size.

According to another embodiment, the obtaining 210 of information indicating a branch-specific phase-shift angle and a branch-specific amplitude comprises the RU 320 performing the following steps: receiving branch-specific beam weights from the BBU 310 over the fronthaul connection 340, and calculating the first phase-shift angle and the second phase-shift angle based on the received branch-specific beam weights. For this embodiment, less computations are needed in the RU compared to when beam attributes are received from the BBU, but fronthaul bitrate will be higher. But especially for complicated beam shapes, it may be more efficient to send beam weights than beam attributes.

According to another embodiment, the obtaining 210 of information indicating a branch-specific phase-shift angle and a branch-specific amplitude comprises the RU 320 performing the following steps: receiving the first and second phase-shift angles for each branch from the BBU 310 over the fronthaul connection 340, or receiving the branch-specific phase-shift angle and a separation angle between the first and the second phase-shifted signals for each branch from the BBU 310 over the fronthaul connection, and calculating the first and the second phase-shift angle for each branch based on the received branch-specific phase-shift angle and the separation angle. This embodiment has even less computations in the RU and higher fronthaul bitrate compared to sending the beam weights over the fronthaul connection.

Turning back to FIG. 4 and FIG. 2, but also to the embodiment shown in FIG. 5, when the antenna elements 114, 115, 116 of the plurality of antenna branches 111, 112, 113 are arranged in an array, the following embodiment is applicable: For a first antenna element of the antenna elements 114, 115, 116 of the plurality of antenna branches 111, 112, 113 that is arranged in an area of a physical edge of the array, attenuating the branch-specific amplitude so that the closer the first antenna element is to the physical edge of the array, the more the branch-specific amplitude is attenuated. Further, the phase-shifting 214 is performed based on the attenuated branch-specific amplitude. Such a feature is called amplitude tapering. This is normally static over time, i.e. the same amplitude tapering is performed over time. The function of amplitude tapering is to attenuate the determined branch-specific amplitude, the more attenuation the closer the antenna element is to the physical edge of the array. Hereby, a larger main lobe and lower side lobes are achieved. The further the antenna element is positioned from the physical edge of the array, the less the amplitude tapering. The area of the physical edge may comprise a certain percentage of the antenna elements of the array. For example, 10-90% of the antenna elements can be said to be in the area of the physical edge of the array. Then the amplitude for those 10-90% are attenuated, the more the closer the individual antenna element is to the actual physical edge of the array.

According to yet another embodiment, which is shown in FIG. 4, the method further comprises obtaining 211 information on a proportion of desired amplitude control, and depending on the proportion of desired amplitude control, adjusting 212, for each antenna branch, the first phase-shift angle and the second phase-shift angle so that for full amplitude control, the first and the second phase-shift angle are maintained, and for no amplitude control, the first and the second phase-shift angles are the same as the branch-specific phase-shift angle, and for semi-amplitude control, an angular difference between the first and the second-phase shift angle is lowered. No amplitude control means phase-only beamforming. Full amplitude control means full amplitude and phase beamforming. By adapting the angular phase shifting of the first and the second signal, as described above, a trade-off between phase-only beamforming and full amplitude and phase beamforming can be achieved in a simple way. Such a trade-off could be of interest for example when higher sidelobe levels can be acceptable and it is of importance to be able to reach far with the signal. An example when this is of interest is when the receiver is at a far distance from the transmitter, so it is of importance to have a high amplitude. In case the transmitter is a base station, and the receiver is a wireless device, this means that the wireless device is at or close to the cell border. Specifically, if the receiving wireless device is at the cell border and there are no other wireless devices in the cell or the other wireless devices are in directions or distances where sidelobe interference is not a large problem, it could be beneficial to decrease the amplitude control, i.e. to keep it more or less closer to full amplitude as compared to the obtained amplitude value used in full amplitude and phase beamforming.

Figure 6:
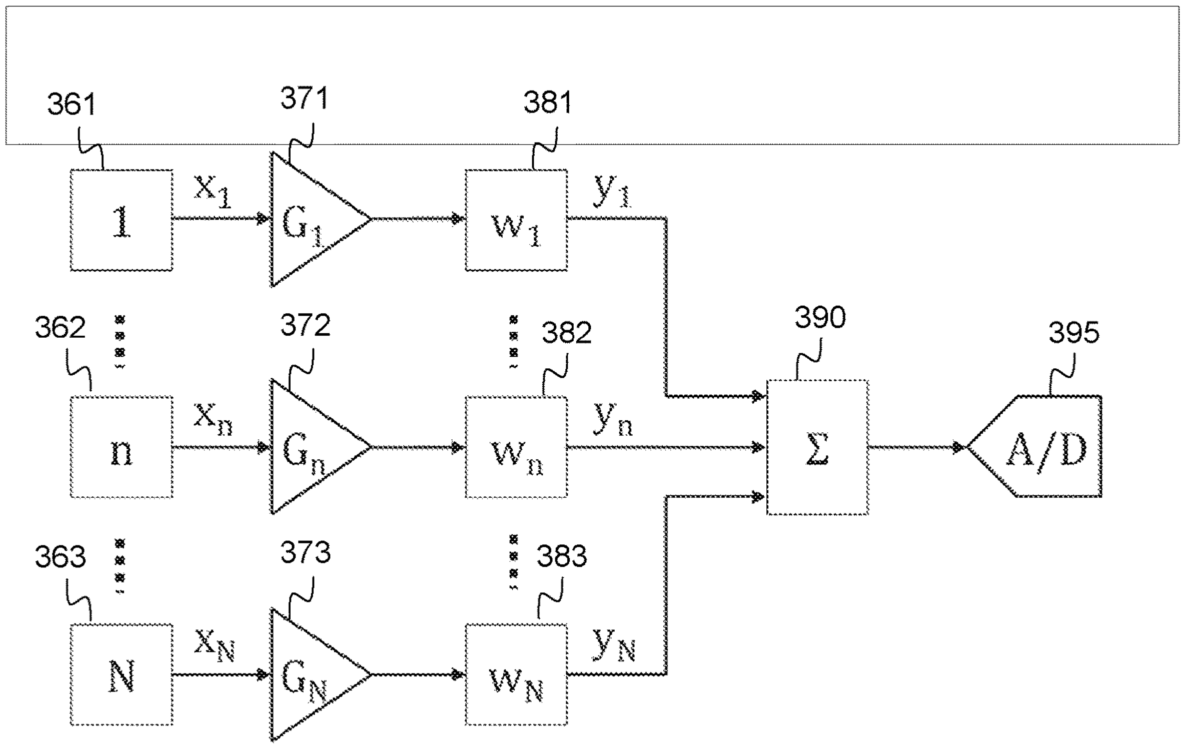
FIG. 6 is a schematic block diagram of a receiver in which the present invention may be used.

As mentioned, beamforming can be implemented in different ways. FIG. 6 shows an example of prior art single-layer analog uplink beamforming where a signal received at antenna elements of each of N antenna branches 361, 362, 363 is treated separately for each antenna branch by being amplified in a branch-specific amplifier 371, 372, 373 and applied an individual beam weight in a beam-weight applicator 381, 382, 383. Thereafter, the signals on the separate branches are combined in a combiner 390 before the combined analog signal is converted from analog to digital form in an A/D converter 395 for further treatment. A similar handling is performed in downlink, but in the opposite direction. In downlink, the A/D converter would be a D/A converter and the combiner would be a splitter. In this disclosure, an antenna branch, aka antenna port is the smallest unit that can be controlled in phase and/or amplitude, e.g. a single antenna element, or a subarray of antenna elements with fixed phase and amplitude distribution within the subarray. To support a second user-layer, e.g. by using two different polarizations, the structure in the figure will be duplicated.

Beam weights are typically determined based on some type of channel state information, or selected from a codebook, e.g. as part of a beam sweep. In order to create shaped beams, e.g. complex multi-beam patterns or wide beams, with low sidelobes in unwanted directions, it is necessary to apply an individual weight to the signal for each antenna branch, preferably where both magnitude and phase of the weight can vary, as described above.

Figure 7:
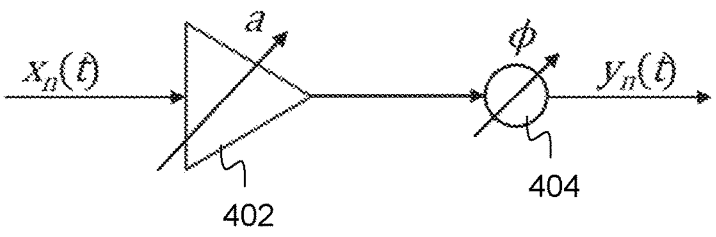
FIG. 7 is a schematic block diagram of a variable amplifier and phase shifter for analog beamforming according to prior art.

For analog beamforming, one may attempt to apply complex weights by using a combination of variable gain/attenuation and phase shift, but it is difficult to achieve enough accuracy when changing analog gain or attenuation using a variable amplifier 402 and phase shifter 404 as shown in FIG. 7 for one antenna branch. Apart from inaccurate amplitude, a change of analog gain or attenuation can also introduce phase errors. Therefore, prior art analog beamforming systems typically only use phase shift, i.e. varying phase and not varying magnitude, which limits the type of beams that can be achieved. Amplitude tapering over the array, which means lower amplitude for elements near the physical edges of the transmitter or receiver, is sometimes used to control sidelobes but this is generally static in order to achieve desired accuracy. A problem with static tapering is that it will reduce BF gain and widen the beams even for cases with a single narrow beam. Also, it is mainly effective for sidelobes stemming from discontinuities in weights at edges of the antenna panel, e.g. between left and right, or top and bottom edge.

Figure 8:
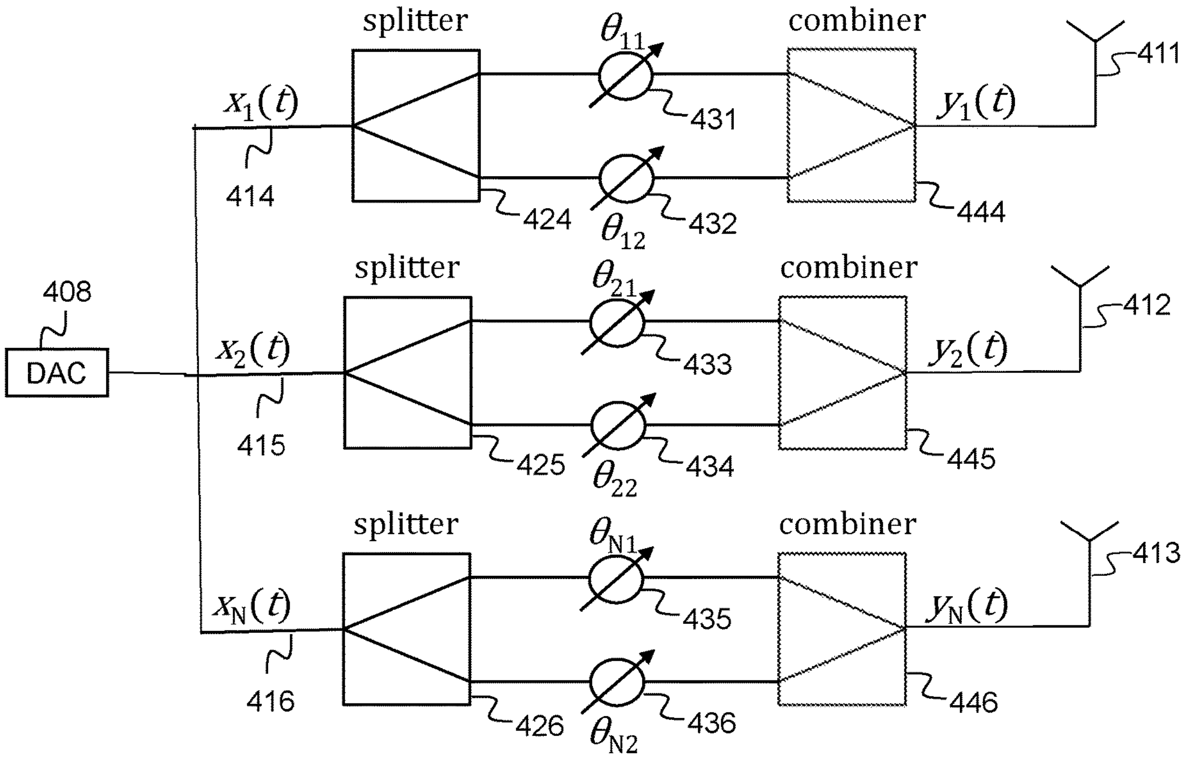
FIG. 8 is a schematic block diagram of a part of a transmitter according to an embodiment.

According to embodiments of this invention, both amplitude and phase variation is achieved adding two different phase-shifted, or different time-delayed, copies of the same antenna signal per antenna branch. The principle is shown in FIG. 8, which shows analog beamforming in a transmitter, i.e. downlink when the transmitter is a base station, using variable phase shifters. The principle works as well for a receiver, i.e. uplink when the receiver is a base station. For analog beamforming, the invention allows higher accuracy than using variable amplifiers to control amplitude. For a transmitter, FIG. 8 shows a D/A converter (DAC) 408, which converts a digital signal into analog format. The analog signal is fed into each antenna branch 414, 415, 416 as branch-specific signals $x_n(t)$, where n=1, 2, . . . N, stands for the number of the antenna branch, by e.g. a not-shown splitter arranged in the common line, i.e. the same line as the DAC 408 is on. The not-show splitter then splits the analog signal into branch-specific signals which are fed into each antenna branch. The branch-specific signal in each of the antenna branches is then split using a splitter 424, 425, 426 in each antenna branch into a first signal and a second signal, per branch. The first and second signals are phase shifted individually and individual for each branch, depending on the requested phase and amplitude for each branch, using a separate phase shifter 431, 432, 433, 434, 435, 436 for each first and second signal of each branch. The individual first and second phase shift angle in FIG. 8 is marked with $\theta_{n1}$ and $\theta_{n2}$, where n=1, 2, . . . , N respectively for the first and the second signal. It should be observed that the first and second phase shift angle $\theta_{n1}$ and $\theta_{n2}$ are individual values for each antenna branch, and normally respectively not the same value between antenna branches. The individually phase shifted first and second signals are then combined by a combiner 444, 445, 446 in each branch into a combined signal $y_n(t)$, n=1, 2, . . . , N per branch. The combined signal $y_n(t)$ per branch is then fed to its respective antenna element or elements 411, 412, 413 where the combined signal of each branch is transmitted wirelessly and simultaneously towards the receivers. The splitters 424, 425, 426 and combiners 444, 445, 446 shown could consist of e.g. branch line couplers or Wilkinson power dividers.

In the following, we will show that the desired beamforming in both phase and amplitude can be achieved by adding two phase-shifted versions of the input signal per branch. The phase shifts and other values calculated below are individual per antenna branch aka port n, but the subscript n is omitted from the phase shifts and other variables to make the notation less cluttered.

$$w_n x_n(t) = \text{constant} \times \left(e^{j\theta_1} + e^{j\theta_2}\right) x_n(t) = (v_1 + v_2) x_n(t)$$

where $v_1$ and $v_2$ are constant-magnitude complex values with the respective phase shifts $\theta_1$, $\theta_2$ from FIG. 8. The principle can thus be proved by showing that the sum of two constant-magnitude vectors is equal to the desired beam weight, expressed as desired branch-specific phase-shift angle and amplitude. First, the desired complex weight for antenna n, $w_n$, is converted to polar form:

$$a = |w_n| \leq A, \quad \phi = \angle w_n$$

where a is the amplitude, A is the maximum amplitude value and $\Phi$ is the phase. Then we define the following value, corresponding to half the separation angle between our two constant-magnitude complex values:

$$\psi = \cos^{-1}(a/A)$$

At this point, the complex beam weight is described by the angle of the beam weight $\phi$ and the angle $\psi$, which controls the amplitude. Now, the two phase-control signals (phase-shift angle pair, called first and second phase angles) for antenna branch n can be calculated as $$\theta_1 = \phi - \psi$$

$$\theta_2 = \phi + \psi$$

The two constant-magnitude complex values become:

$$v_1 = \frac{A}{2} e^{j\theta_1}$$

$$v_2 = \frac{A}{2} e^{j\theta_2}$$

Figure 9:
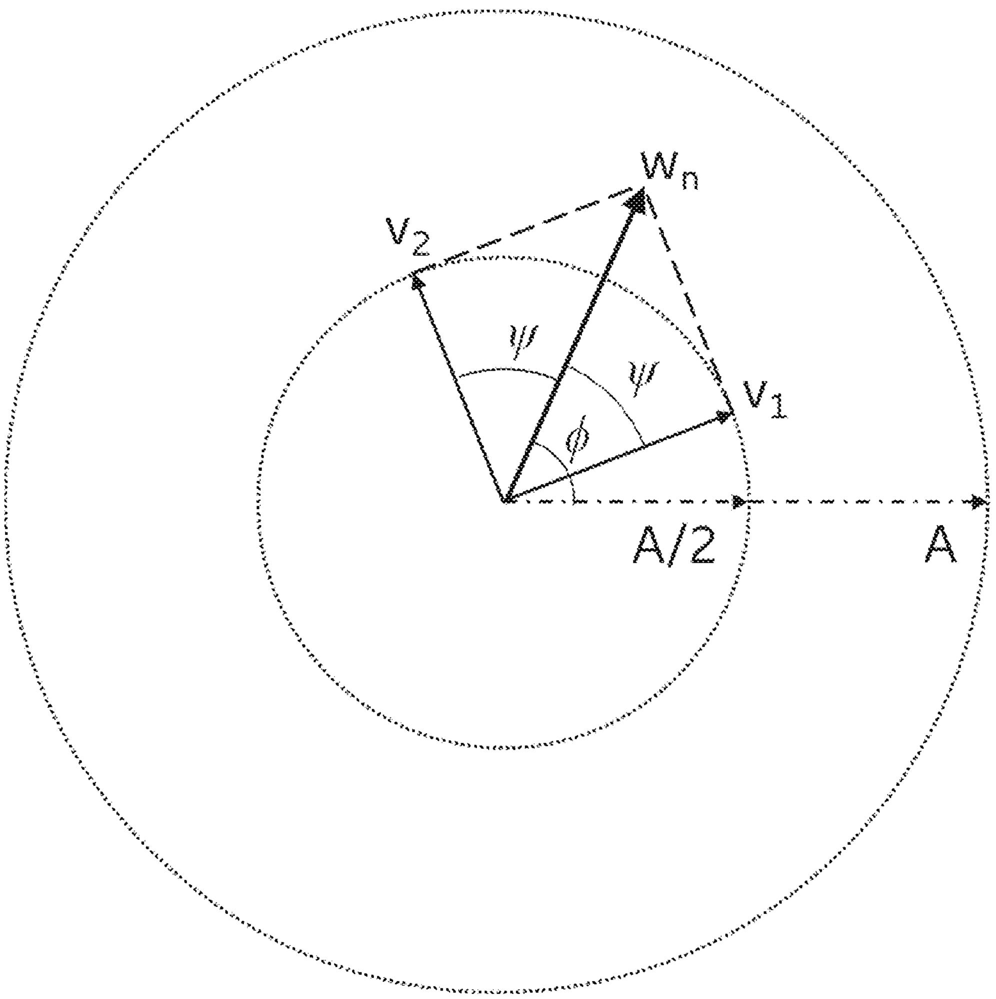
FIG. 9 is a polar coordinate system in which it is illustrated how a beam weight can be decomposed into two constant-magnitude values.

By adding the two constant-magnitude complex values and evaluating the expression, we get $$v_1 + v_2 = \frac{A}{2}\left(e^{j\theta_1} + e^{j\theta_2}\right) = \frac{A}{2}\left(e^{j(\phi-\psi)} + e^{j(\phi+\psi)}\right) = \frac{A}{2} 2\cos(\varphi) e^{j\phi} = A\cos\left(\cos^{-1}(a/A)\right) e^{j\phi} = \ldots = a e^{j\phi} \equiv w_n$$

which completes the proof. This means that we can apply any desired complex beam weight, with absolute value not exceeding A, by adding two phase shifted versions of the same signal, see FIG. 9. FIG. 9 shows how the complex amplitude and phase beam weight $w_n$ can be decomposed into two constant-magnitude complex values $v_1$ and $v_2$, each with magnitude A/2, as long as the maximum magnitude of the beam weight is not larger than A. The maximum amplitude value A may be different for different antennas branches, e.g. if static amplitude tapering is applied.

It is possible to smoothly change between phase-only BF and amplitude+phase BF by adjusting only the separation angle 2ψ, e.g. by applying a function or by scaling the separation angle with a value between 0 and 1, where 0 means phase-only BF and 1 means full amplitude+phase BF. This may be desired in certain cases to trade BF gain versus sidelobe levels. Similar control is also possible by e.g. applying a function to the magnitude of the beam weight.

Most operations above are common in digital signal processing, e.g. conversion to polar format. The inverse cosine function, i.e. arccos function, could be implemented e.g. by a 1-dimensional table look-up. It should be noted that the phase control signals change infrequently compared with the data signal. Typically, beam weights are changed every slot, e.g. every 14 OFDM symbols for 5G NR, or at most every OFDM symbol, which means that the lifetime of the phase control signals is typically thousands of data samples. Therefore, the overall complexity of the transmitter is not expected to increase noticeably when the invention is implemented.

We have shown that determination of the phase offsets or constant-magnitude complex vectors can be done from complex beam weights, but it is not mandatory to start with the desired beam weights; it is also possible to use other inputs such as channel state information or codebook-based information. For example, one well-known uplink beamforming scheme is Maximal Ratio Combining (MRC) where the beam weight is the complex conjugate of the channel estimate. Thus, if a channel estimate is available, and MRC is desired, it is easy to modify the formulas above to calculate the first and second phase shift angles $\theta_{n1}$ and $\theta_{n2}$ from the channel estimate instead of from the beam weights. The same principle is applicable to downlink with Maximal Ratio Transmission (MRT).

The calculation of the two phase-offsets from channel state information or beam weight can either be done in the transmitter or in another node and sent to the transmitter. One embodiment where this is performed is for a distributed base station system 300 such as the one described in FIG. 5. In such a distributed base station system, the calculation of data such as beam weights or phase angles may then be done in the BBU 310 and sent to the RU 320 via the fronthaul connection (FH). If the first and second phase shift angles are sent over FH, it may be desired to reduce the bitrate. If the calculation is done in the RU 320, it may still be of interest to have an efficient representation to reduce memory requirements.

There are several options regarding what beam-related information to send over the FH or keep in memory/storage of the RU 320. Apart from impact on FH bitrate and storage requirements, different options will also have different impact on the amount of processing needed in the RU 320. The following list gives examples of options for what to send over the FH:

- Channel state information where the RU may use a beamforming algorithm e.g. MRT/MRC, Zero Forcing (ZF), Minimum Mean-Square Error (MMSE) to determine beam weight per antenna port, $w_n$
- Beamspace representation, where multiple pencil beams may need to be combined to determine desired $w_n$
- Beam attributes, where complicated beam shapes can be described by a set of one or more pointing directions and beam widths.
- Beam weight per antenna port ($w_n$), which is common for massive Multiple Input Multiple Output (MIMO) RUs in lower frequency bands, i.e. non mmW.
- The phase-shift angle-pair, aka first and second phase-shift angle used in the invention, or intermediate values calculated from the beam weight per antenna port, $w_n$.

In the first three options above, the most straightforward method is for the RU to first determine, i.e. calculate or use a table lookup, the beam weight per antenna port $w_n$, based on the information received from the BBU over the FH, and then calculate the desired phase shift angle pair for each antenna branch.

According to the first option, i.e. to the RU obtaining channel state information (CSI), the following applies. CSI could be acquired e.g. from measurements on reference signals in uplink, i.e. by the base station, and/or in downlink, i.e. by the wireless device. The CSI may comprise:

- a channel path gain matrix describing complex path gain between base station antenna branches and one or more wireless device antennas
- precoding matrix indication sent from the one or more wireless devices.

From CSI it is possible for the RU to calculate beam weight per antenna port, $w_n$, using methods known in prior art. For example, using a scaled conjugate of the complex channel path gain as in Maximal Ratio Combining/Transmission (MRC/MRT), using zero-forcing (ZF), or using MMSE beamforming.

According to the second option, i.e. to receive beamspace representation over the FH, the following applies. A beamspace representation is typically based on a transform of beam weights per antenna port, into a space where most signal energy is concentrated into fewer coefficients than the number of antenna ports. This can be used for compression of beam weights and is typically based on a codebook.

A common method for transforming beam weights is the Discrete Fourier Transform (DFT), where the codebook is the set of DFT basis vectors. The number of entries in the codebook can be larger than the number of antenna ports, e.g. if the DFT is oversampled. Such oversampling is done to achieve better resolution in the beam pointing direction, i.e. scanning angle. Singular Value Decomposition (SVD) has better energy compaction properties than DFT but it is data dependent, which makes it impractical for communicating beamspace information, as in addition to coefficients, the codebook, which can be a big matrix, would have to be sent. Other transforms than DFT, with or without oversampling, including ones based on pre-calculated codebooks, are also possible. Codebooks are not restricted to orthogonal beams.

With beamspace representations, a set of simple "pencil beams" or, in general, single beams from a codebook, are combined to calculate beam weight per antenna port, $w_n$. For DFT-based beams, the beam weight per antenna port, $w_n$, can be calculated directly based on an inverse transform of the beamspace coefficients, i.e. complex beam scaling values, where coefficients for unused beams are padded with zeroes before the inverse transform. If only a small number of DFT-based beams are active, it may be more efficient to use the so called Goertzel algorithm directly on each of the beamspace coefficients and adding the results for each antenna port. This does not require padding with zeros and avoids calculating a full-size transform.

For table-based codebooks, beam weights per antenna port are determined separately for each active beam and then a linear combination is performed using the coefficients to get total beam weight per antenna port, $w_n$. Then the RU can proceed by calculating the first and second phase-shift angles based on the beam weight, per antenna port.

Different options are possible regarding how to represent the beamspace information over the FH: According to one option, a single index into a codebook is transmitted over the FH. The single index could be based on DFT basis vectors or pre-calculated, e.g. using constrained optimization techniques to approximate a desired beam using phase-only beamforming. This is used to generate a single pencil beam e.g. in prior art analog beamforming.

According to another option, an indication of active beams from a codebook, using a bitmap or a list of indices to active beams, is transmitted over the FH. This can be used if there is no need to have different phase or magnitude for the codebook beams when combining them, i.e. each beam has a coefficient of 1. With $N_c$ different codebook beams available, a bitmap supporting any combination of simultaneous beams require $N_c$ bits on the FH, excluding any overhead. If the number of simultaneous codebook beams, $N_b$, is restricted, it may be more efficient to use a list of indices to describe the shaped beam. Each index requires $\log_2(N_c)$ bits so a list of indices is more efficient if $N_b \times \log_2(N_c) < N_c$, or equivalently $N_b < N_c/\log_2(N_c)$. For example, with $N_c=256$, the crossover point is at $N_b=32$ simultaneous beams. For mmW beamforming using the invention, it is expected that the number of simultaneous beams is small compared with the number of antennas and therefore a list may be more efficient in practice.

According to yet another option, an indication of active beams from a codebook, as in the previous option, but including a scale value per codebook beam, is transmitted over the FH. The scale value can be real or complex and can be used to change gain and/or phase for each codebook beam, in order to have more control over the resulting total beam. The scale value could be in cartesian format, e.g. 8 bits each for real and imaginary part, or in polar format, preferably with more bits for the phase than for the magnitude.

Figure 1:
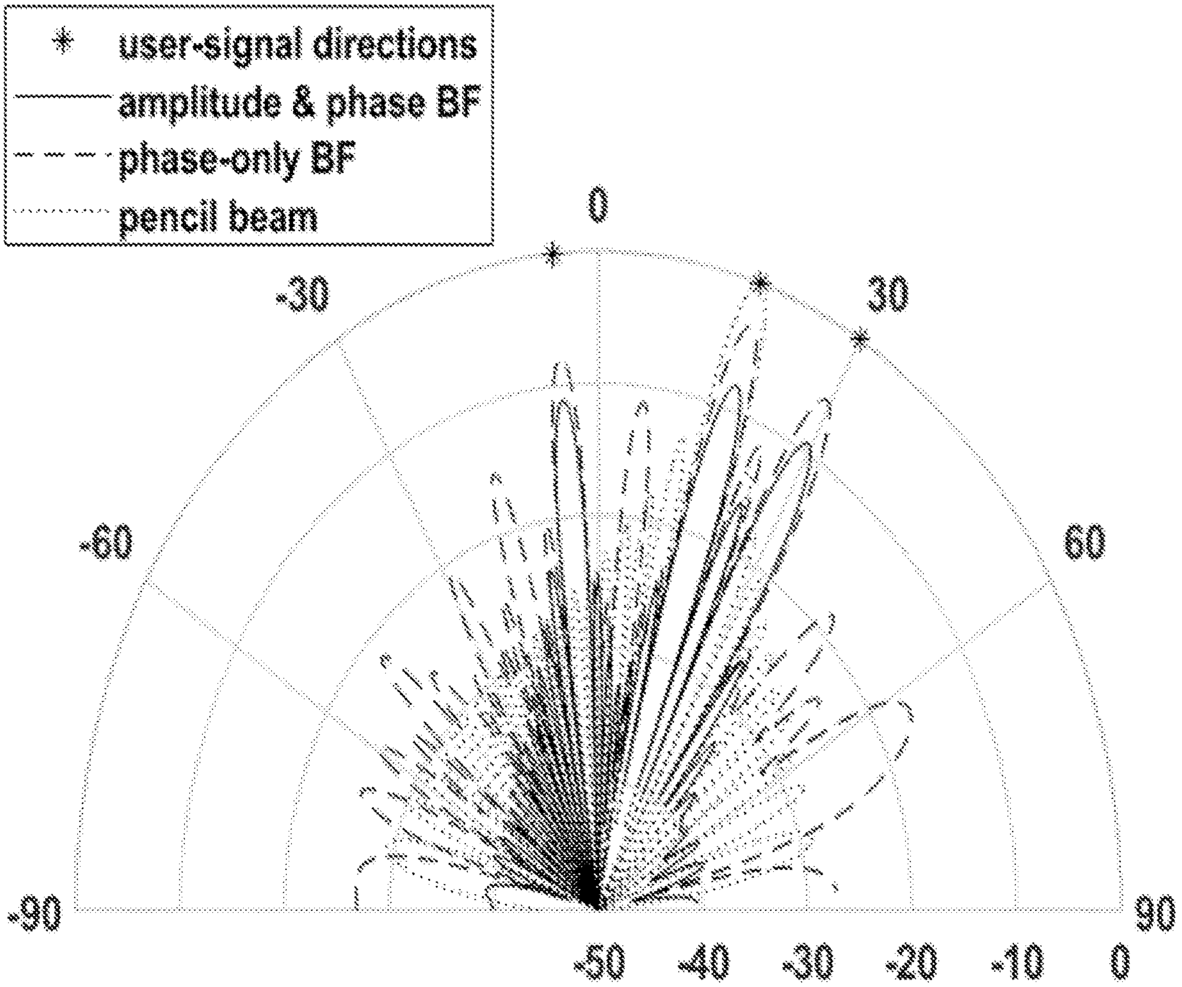
FIG. 1 is a polar diagram of normalized beamforming gain versus direction for an example where the receivers are in three different directions (−5°, +18°, and +30°) for three different analog beamforming methods.

Enabling a set of active beams without any scaling (beamspace coefficient=1) can work well if the beams are sufficiently separated and intended for different users, i.e. sent in different resource blocks. However, if the set of active beams are for a single user, or if a wide beam is desired, it is often not sufficient to just enable beams without any gain/phase adjustment since the result could be destructive interference when combining the different beams. When receiving/transmitting signals from/to a single user in different directions, it is important to be able to control phase on the different beams to avoid destructive interference. Also, to get the best SINR, some gain scaling is also desired. An example could be the situation in FIG. 1 where the three beams, directed to the three users, have different gain, where more gain is applied in directions with stronger signal to avoid enhancing noise.

Figure 10:
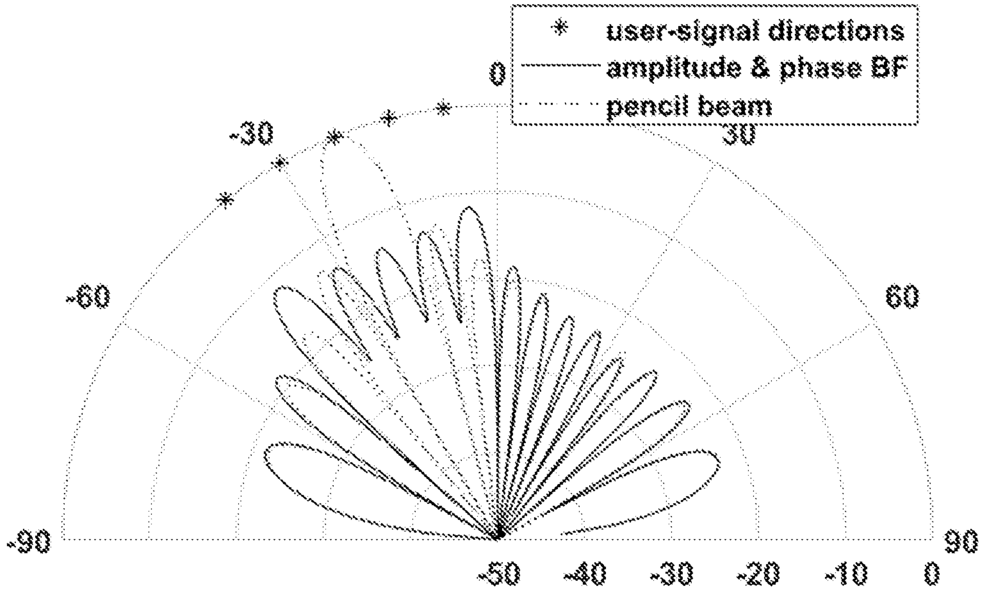
FIG. 10 is a polar coordinate diagram illustrating an example where five receivers are transmitted to simultaneously using three different analog beamforming methods.

FIG. 10 shows an attempt to create a single wide beam by activating five adjacent codebook, i.e. pencil beams in a 16-element array without DFT oversampling and without any scaling, that is same gain and phase are used for all five pencil beams. As seen from the solid-line shape in FIG. 10, the individual beams are clearly visible but sidelobe levels are rather high. For reference, a single pencil beam from the same codebook is also shown, as a dotted line. This single pencil beam is directed to the user in the middle. As can be seen, the solid-line shape does not look like a single wide beam due to the large ripple in the antenna gain. It may be usable to communicate with up to 5 different users, on different resource blocks, or to send a common channel to all, but since beams are very narrow, high user mobility and/or beam pointing error may be an issue where a proper wide beam would be preferable. When comparing with the pencil beam, marked with the dotted line, it can be observed that the problem is not that the five individual beams are too narrow, but rather that there is destructive interference when adding the beams. By adjusting the (complex) scaling of each individual beam, it is possible to get a more desirable shape of the wide beam.

Figure 11:
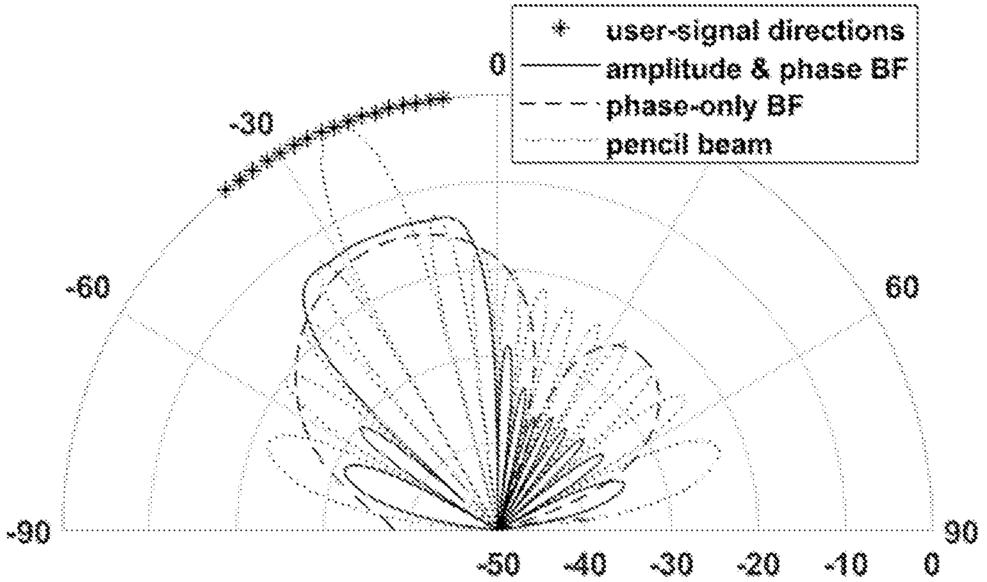
FIG. 11 is another polar coordinate diagram illustrating an example where many receivers are transmitted to simultaneously using three different analog beamforming methods.

Here, it was empirically determined that a linear phase decrease with a step of 1.83 radians for each codebook beam will make the wide beam shape more desirable since constructive interference will then occur in the middle between each pair of beams. Further, fine-tuning can be done by gain scaling, in this case by reducing the magnitude of the outermost beams by 10%. The result is shown in FIG. 11, with the same five beams active but now with proper scaling. The main lobe is now much flatter with a high gain and the sidelobe levels are reduced significantly, see the solid line of FIG. 11. Here, we also compare with phase-only beamforming (dashed line), where a prior art method for achieving a wide beam is to only enable a subset of the antenna elements, in this case the first three out of the 16 antennas, since round(16/5)=3. The phase-only beamforming results in higher sidelobe levels, lower beamforming gain, and less flat gain in the main lobe. The amplitude and phase BF using gain scaling (the solid line) is also compared with a single pencil beam marked with a dotted line.

In this case, complex scaling was used on the active beams, to achieve the desired shape. However, this does not necessarily mean that the complex scaling (gain/phase) has to be sent over the FH interface. For a wide beam as the above, it was observed that the same scaling, i.e. 1.83 radian phase step from one beam component to the next, minor magnitude reduction at the edge beams, achieves good results over a wide range of scanning angles for the wide beam. This means that at least certain wide beams can be created when only an indication of active beams from a codebook is sent over the FH interface, and scaling factor is determined in the RU, e.g. as constant values or based on a lookup table. For other cases, it could still be beneficial to include beam scaling over the FH interface.

Figure 12:
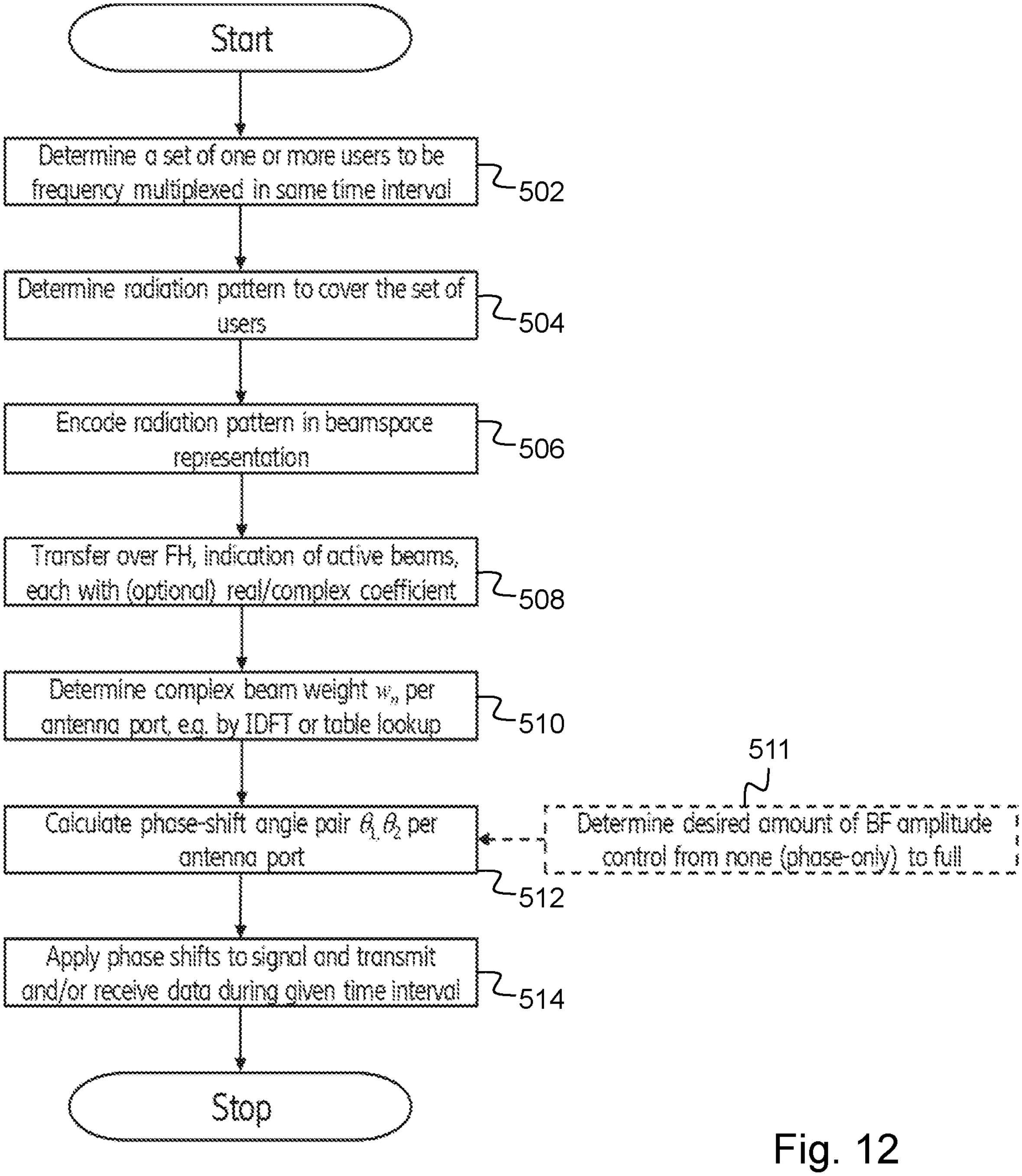
FIG. 12 is a flow chart of a method according to an embodiment.

An example method for analog beamforming when sending beamspace information over a FH connection between a first node and a second node is shown in FIG. 12, with reference to FIG. 5. The first node may be a BBU 310 or a digital unit (DU), and the second node may be a RU 320 or similar type of unit. The method starts by the first node determining 502 a set of one or more users, i.e. wireless devices, to be frequency multiplexed in the same time interval. Thereafter, the first node determines 504 a radiation pattern to cover the set of users, based on e.g. channel state information. Then the first node encodes 506 the radiation pattern in a beamspace representation, the beamspace representation comprising an indication of active beams and a possibly scaling factor for each beam, and transfers 508 over the FH connection an indication of active beams, each with an optional real or complex coefficient. Then the second node, after receiving the indication of active beams, determines 510 complex beam weights per antenna port, i.e. antenna branch, for example by Inverse Discrete Fourier Transform (IDFT) or by using a look-up table. Thereafter, the second node calculates 512 phase-shift angle pairs, i.e. first and second phase shift angles, per antenna branch. As input to this calculation, the second node may determine 511, or receive information of, BF amplitude control, i.e. proportion of desired amplitude control, from 0, i.e. phase-only control, to 1, i.e. full amplitude and phase control. Thereafter, the second node applies 514 the calculated phase-shift angle pairs to the first and second split signals, per antenna branch, and transmits data during a given time interval. In case the second node works as a receiver it instead receives data during the given time interval.

According to yet another option, beam attributes or an indication of beam attributes are sent over the FH connection to the RU. Beam attributes may comprise e.g. a list of pointing direction(s) and beam width(s) in azimuth and elevation, possibly also including a real or complex scaling value per beam. This may include table lookup in the RU to find the beam weight per antenna branch for each beam. Beam attribute representation can be effective when the shaped beam can be described as a combination of a small number of wide beams or beams with specific properties. Further, an advantage over beamspace representation is that the resolution of e.g. beamwidth, and the information sent over the FH connection/interface, are not dependent on the codebook size.

Further, the RU could approximate the requested beam attributes by converting to the nearest beamspace, e.g. codebook, representation and proceeding as in the previous option. Another option is to convert the attributes directly to beam weight per antenna port for each beam and perform a linear combination to get the total beam weight per antenna port, $w_n$. For example, Fourier transform relationships could be used to create a wide beam by approximating the beam with a rectangle in antenna gain versus spatial angle domain, and calculating the corresponding (truncated) sinc (i.e. sin (x)/x) function in the antenna port/element space. A change of pointing direction is done by changing the phase slope over the antenna elements.

According to still another option, beam weights per antenna port, i.e. branch, are sent over the FH connection to the RU. Here, beam weights per antenna branch, $w_n$, can be calculated in the first node e.g. a DU or a BBU, in a dedicated beamforming processing unit, in a fronthaul gateway, or as a beamforming processing function in the cloud, and sent to the RU, typically in cartesian format, i.e. real and imaginary part, or in polar format, i.e. phase and magnitude a. The main advantage is that less computations are needed in the RU compared with when beam attributes are sent. For simple shaped beams, FH bitrate will be higher than if beam attributes are sent, but for complicated beam shapes, consisting of a large number of pencil beams with different scaling, it may be more efficient to send beam weights per antenna branch.

Figure 13:
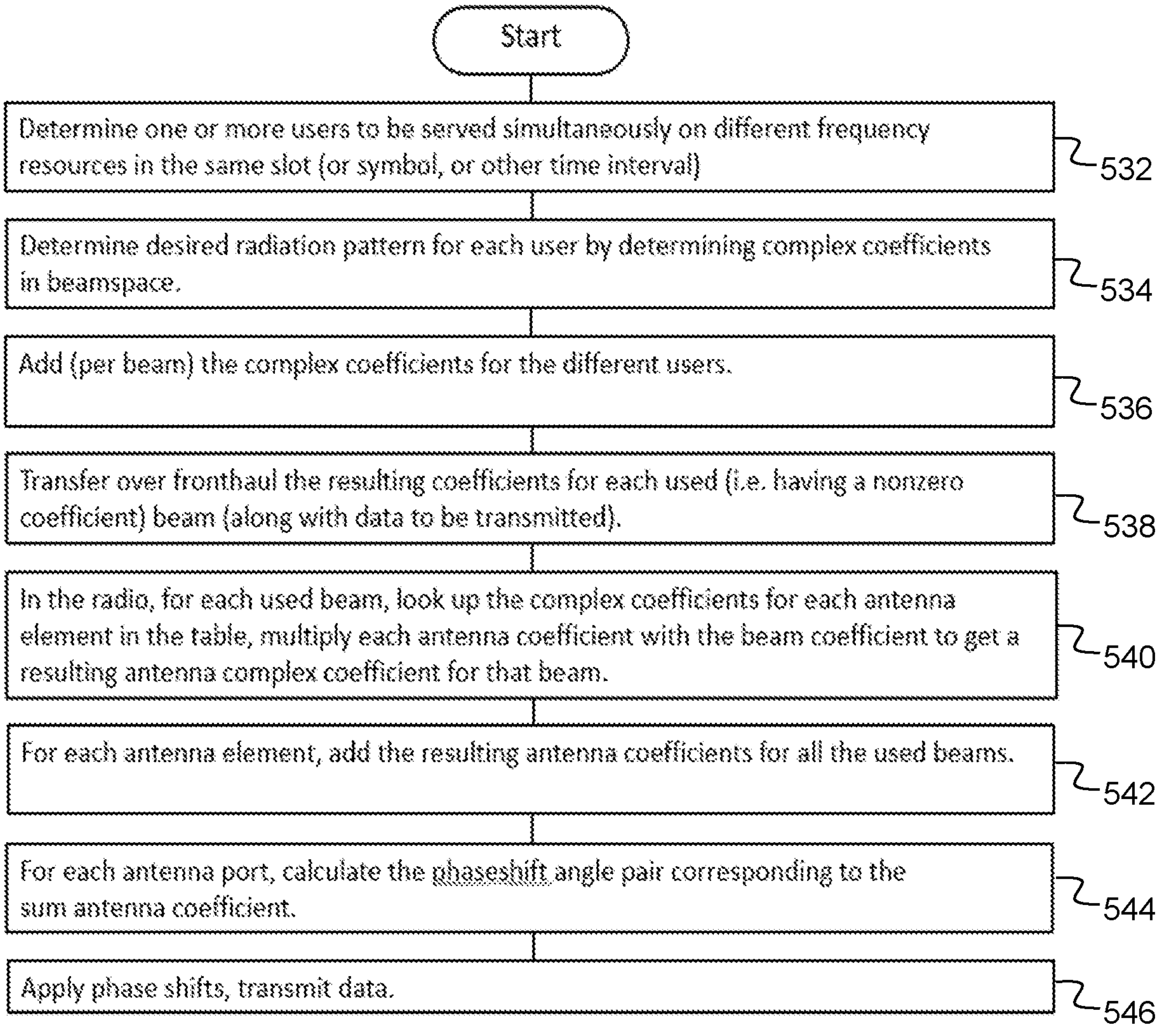
FIG. 13 is another flow chart of a method according to another embodiment.

An example method for analog beamforming when sending beam weights over a FH connection between a first node and a second node is shown in FIG. 13. The first node may be a BBU or a digital unit (DU), and the second node may be a RU or similar type of unit.

The method starts by the first node determining 532 one or more users, i.e. wireless devices, to be frequency multiplexed in the same time interval, e.g. slot or symbol. Thereafter, the first node determines 534 a desired radiation pattern for each user, based on channel state information, by determining for each user, complex coefficients in beamspace for each beam in the desired radiation pattern. Then, for each beam the complex coefficients for all users are added 536 together. Thereafter, the resulting coefficient for each used beam is transferred 538 over the FH, preferably along with the data that is to be transmitted wirelessly towards the users. Then, after receiving the resulting beam coefficients over the FH, the second node for each beam looks-up 540 the complex coefficient for each antenna branch in a look-up table using the beam number as index into the table, and multiplies each of the looked-up antenna branch coefficients with the resulting beam coefficient for the beam to get a resulting antenna branch complex coefficient for the beam for each antenna branch. Then, for each antenna branch, the resulting antenna coefficients for all used beams are added 542 together, resulting in a single complex coefficient for each antenna branch. Further, for each antenna branch, the phase-shift angle pair, i.e. first and second phase-shift angle, is calculated 544 corresponding to the resulting antenna coefficient. Thereafter, the second node applies 546 the calculated phase-shift angle pairs to the first and second split signals, per antenna branch, and transmits data during a given time interval. In case the second node works as a receiver it instead receives data during the given time interval. Further, it may be needed to adjust the amplitudes by a same factor to keep the totally radiated power within allowed levels and to make sure that the power asked for on any branch is within technical limits.

According to still another option, phase-shift values or intermediate phase-shift values are sent over the FH connection to the RU. The following options have similar pros and cons as sending beam weight per antenna branch, i.e. high FH bitrate in case of large number of antenna branches, but complexity of the RU is reduced further compared with sending beam weight per antenna port by moving the phase-shift value calculations from the RU to the first node, e.g. the BBU. A disadvantage is of course that these two options cannot be used together with legacy RUs, i.e. RUs that are not using the invention, which means that two different options have to be maintained when mixing legacy RUs and RUs using the invention in a wireless communication network.

In the first option, intermediate phase values $\phi$ and $\psi$ per antenna branch are determined by the first node and sent over the FH connection. Here $\phi$ has uniform distribution, and $\psi$ is the separation, or amplitude-control, angle having non-uniform distribution. Here, $\psi$ may benefit from non-uniform quantization, e.g. by companding, i.e. compressing and expanding to allow fewer bits in a quantizer, combined with uniform quantization, or by non-uniform quantization e.g. using Max-Lloyd to calculate the quantizer intervals and codewords. Quantization performance should be similar to quantizing beam weight per antenna branch using a suitable non-uniform quantizer. The intermediate phase values are then converted in the RU into the phase-shift angle pair, i.e. first and second phase-shift angle, per antenna branch In the second option, the phase shift angle pair $\vartheta_1$ and $\vartheta_2$ are determined per antenna branch by the first node and sent over the FH connection. This means the lowest complexity in the RU. Both angles of each phase-shift angle pairs have uniform distribution, but the conditional distribution of the two angles for a given $\phi$ is not uniform, which means that this representation is probably less good than the former with regards to quantization errors.

Figure 14:
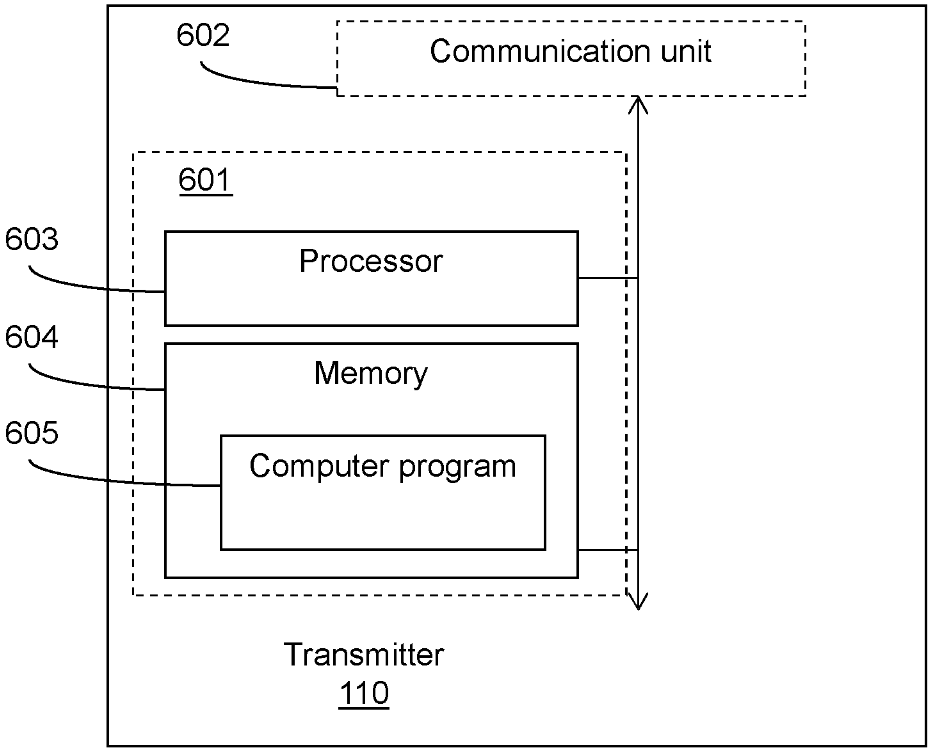
FIG. 14 is a schematic block diagram of a transmitter in more detail, according to an embodiment.

FIG. 14 shows a transmitter 110 operable in a wireless communication network 100 configured for analog beamforming. The transmitter 110 comprises a plurality of antenna branches 114, 115, 116, each antenna branch comprising an antenna element 111, 112, 113. The transmitter 110 also comprises a processing circuitry 603 and a memory 604. The memory contains instructions executable by said processing circuitry, whereby the transmitter 110 is operative for, for each antenna branch 114, 115, 116, obtaining a first and a second signal of an analog radio signal, the first and the second signal being split from the analog radio signal and the analog radio signal being the same at each of the antenna branches, and obtaining information indicating a branch-specific phase-shift angle and a branch-specific amplitude determined from information identifying a radiation pattern comprising at least two directions for wireless transmission to at least one receiver 120. The transmitter 110 is further operative for, for each antenna branch 114, 115, 116, phase-shifting the first signal according to a first phase-shift angle and the second signal according to a second phase-shift angle, the first and the second phase-shift angle being selected so that when the first and the second signals are combined, the combined signal has the branch-specific phase-shift angle and the branch-specific amplitude indicated by the obtained information, combining the phase-shifted first and second signals into a combined signal, and transmitting, wirelessly, the combined signal through the antenna element 111, 112, 113.

According to an embodiment, the transmitter 110 is an RU 320 operable in a distributed base station system 300 that further comprises a BBU 310 interconnected with the RU 320 via a fronthaul connection 340. Further, the at least one receiver 120 is one or more wireless devices 331, 332, 333.

According to another embodiment, the transmitter 110 is operative for the obtaining of information indicating a branch-specific phase-shift angle and a branch-specific amplitude by the RU 320: obtaining an estimation of a wireless communication channel between the RU (320) and the one or more wireless devices 331, 332, 333; determining branch-specific beam weights for each antenna branch based on the estimation of the wireless communication channel; and calculating the first phase-shift angle and the second phase-shift angle for each antenna branch based on the determined branch-specific beam weights.

According to another embodiment, the transmitter 110 is operative for the obtaining of information indicating a branch-specific phase-shift angle and a branch-specific amplitude by the RU 320: receiving, from the BBU 310 over the fronthaul connection 340, a beamspace representation of an estimation of a wireless communication channel between the RU 320 and the one or more wireless device 331, 332, 333; determining branch-specific beam weights for each antenna branch based on the received beamspace representation, and calculating the first phase-shift angle and the second phase-shift angle for each antenna branch based on the determined branch-specific beam weights.

According to another embodiment, the transmitter 110 is operative for the obtaining of information indicating a branch-specific phase-shift angle and a branch-specific amplitude by the RU 320: receiving, from the BBU 310 over the fronthaul connection 340, beam attributes determined from an estimation of a wireless communication channel between the RU 320 and the one or more wireless device; determining branch-specific beam weights based on the received beam attributes; and calculating the first phase-shift angle and the second phase-shift angle based on the determined branch-specific beam weights.

According to another embodiment, the transmitter 110 is operative for the obtaining of information indicating a branch-specific phase-shift angle and a branch-specific amplitude by the RU 320: receiving branch-specific beam weights from the BBU 310 over the fronthaul connection 340, and calculating the first phase-shift angle and the second phase-shift angle based on the received branch-specific beam weights.

According to another embodiment, the transmitter 110 is operative for the obtaining of information indicating a branch-specific phase-shift angle and a branch-specific amplitude by the RU 320: receiving the first phase-shift angle and the second phase-shift angle for each branch from the BBU 310 over the fronthaul connection 340, or receiving the branch-specific phase-shift angle and a separation angle between the first and the second phase-shifted signals for each branch from the BBU 310 over the fronthaul connection, and calculating the first and the second phase-shift angle for each branch based on the received branch-specific phase-shift angle and the separation angle.

According to yet another embodiment, the antenna elements 114, 115, 116 of the plurality of antenna branches 111, 112, 113 are arranged in an array. Further, for a first antenna element of the antenna elements 114, 115, 116 of the plurality of antenna branches 111, 112, 113 that is arranged in an area of a physical edge of the array 110, the transmitter 110 is operative for attenuating the branch-specific amplitude so that the closer the first antenna element is to the physical edge of the array, the more the branch-specific amplitude is attenuated, and wherein the transmitter is operative for performing the phase-shifting based on the attenuated branch-specific amplitude.

According to yet another embodiment, the transmitter 110 is further being operative for: obtaining information on a proportion of desired amplitude control; and depending on the proportion of desired amplitude control, adjusting, for each antenna branch, the first phase-shift angle and the second phase-shift angle so that for full amplitude control, the first and the second phase-shift angle are maintained, and for no amplitude control, the first and the second phase-shift angles are the same as the branch-specific phase-shift angle, and for semi-amplitude control, an angular difference between the first and the second-phase shift angle are lowered.

According to other embodiments, the transmitter 110 may further comprise a communication unit 602, which may be considered to comprise conventional means for wireless communication with the at least one receiver 120, such as a transceiver for wireless transmission and reception of signals in the communication network. In case the transmitter 110 is located in a RAN node, the communication unit 602 may also comprise conventional means for communication with other RAN nodes of the wireless communication network 100. In case the transmitter 110 is located in an RU, the communication unit 602 may also comprise conventional means for communication with its BBU. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the transmitter 110 to perform the steps described in any of the described embodiments of the transmitter 110 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 605. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 604. Alternatively, the computer program may be stored on a server or any other entity to which the transmitter 110 has access via the communication unit 602. The computer program 605 may then be downloaded from the server into the memory 604.

Even though most of the disclosure is related to transmitters and methods in transmitters, the invention and its embodiments is equally applicable in a receiver. A person skilled in the art understands that "a transmitter" may in fact be a transceiver, i.e. having both transmitting and receiving abilities, as well as "a receiver" can be a transceiver. However, to make it easier for the reader to separate the nodes when reading they are here called transmitter and receiver.

In a general sense, a desired phase and amplitude on antenna element(s) of an antenna branch can be achieved by feeding to the antenna branch a signal that is the combination of two signals which are the same, except that the phase of each signal is individually controllable per signal and per branch, possibly except for a fixed difference in amplitude. By controlling the phases of both signals according to the mathematical explanation given in this disclosure, the phase and amplitude of the signal fed to the branch can be controlled. Similarly, for reception, a signal wirelessly received on an antenna branch may be split into two signals, each signal subjected to a controlled phase shift and then combined, to achieve a desired phase shift and gain/attenuation of the signal. The described phase control can be used to control the radiation pattern of an AAS.

The phases of the signals to be combined are kept constant for a time sufficient for useful information to be transmitted. The rate of change in control of the phases of the two signals from one setting to another is lower than the bandwidth of the signal, normally less than 10% and preferably less than 1% or 0.1% of the bandwidth of the signals, in order to allow useful information to be transmitted and not cause signal distortion. Hence, the information content is the same for the two signals that are combined and the combined signal. Only phase and/or amplitude are changed, but the shape of the signal curve is the same. That the two signals have the same amplitude is advantageous but not strictly necessary. A difference in amplitude will shrink the achievable amplitude range for the combined signal. The mathematical explanation given is then adapted to the case of different amplitudes using standard methods for addition of vectors or complex numbers. The two signals are typically created by splitting a common signal that is to be transmitted or a signal that has been received. In other words, in a method for controlling the phase and optionally amplitude of a signal to be transmitted on or received from an antenna element, two signals having the same shape and subjected to individually controlled phase shifts are combined, wherein the phase shifts are set so that the combined signal has a desired amplitude and phase and the rate of changing of the setting of the phase shifts is lower than the bandwidth of the signals.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method for analog beamforming performed by a transmitter of a wireless communication network, the transmitter comprising a plurality of antenna branches, each antenna branch comprising an antenna element, the method comprising, for each antenna branch:

obtaining a first and a second signal of an analog radio signal, the first and the second signal being split from the analog radio signal and the analog radio signal being the same at each of the antenna branches;

obtaining information indicating a branch-specific phase-shift angle and a branch-specific amplitude determined from information identifying a radiation pattern comprising at least two directions for wireless transmission to at least one receiver;

phase-shifting the first signal according to a first phase-shift angle and the second signal according to a second phase-shift angle, the first and the second phase-shift angle being selected so that when the first and the second signals are combined, the combined signal has the branch-specific phase-shift angle and the branch-specific amplitude indicated by the obtained information;

obtaining information on a proportion of desired amplitude control;

depending on the proportion of desired amplitude control, adjusting, for each antenna branch, the first phase-shift angle and the second phase-shift angle so that for full amplitude control, the first and the second phase-shift angle are maintained, and for no amplitude control, the first and the second phase-shift angles are the same as the branch-specific phase-shift angle, and for semi-amplitude control, an angular difference between the first and the second-phase shift angle are lowered;

combining the phase-shifted first and second signals into a combined signal; and transmitting, wirelessly, the combined signal through the antenna element.

2. The method of claim 1, wherein the transmitter is a radio unit (RU) of a distributed base station system that further comprises a baseband unit (BBU) interconnected with the RU via a fronthaul connection, and the at least one receiver is one or more wireless devices.

3. The method of claim 2, wherein the obtaining of information indicating a branch-specific phase-shift angle and a branch-specific amplitude comprises, the RU:

obtaining an estimation of a wireless communication channel between the RU and the one or more wireless devices, determining branch-specific beam weights for each antenna branch based on the estimation of the wireless communication channel, and calculating the first phase-shift angle and the second phase-shift angle for each antenna branch based on the determined branch-specific beam weights.

4. The method of claim 2, wherein the obtaining of information indicating a branch-specific phase-shift angle and a branch-specific amplitude comprises the RU:

receiving, from the BBU over the fronthaul connection, a beamspace representation of an estimation of a wireless communication channel between the RU and the one or more wireless device, determining branch-specific beam weights for each antenna branch based on the received beamspace representation, and calculating the first phase-shift angle and the second phase-shift angle for each antenna branch based on the determined branch-specific beam weights.

5. The method of claim 2, wherein the obtaining of information indicating a branch-specific phase-shift angle and a branch-specific amplitude comprises the RU:

receiving, from the BBU over the fronthaul connection, beam attributes determined from an estimation of a wireless communication channel between the RU and the one or more wireless device, determining branch-specific beam weights based on the received beam attributes, and calculating the first phase-shift angle and the second phase-shift angle based on the determined branch-specific beam weights.

6. The method of claim 2, wherein the obtaining of information indicating a branch-specific phase-shift angle and a branch-specific amplitude comprises the RU:

receiving branch-specific beam weights from the BBU over the fronthaul connection, and calculating the first phase-shift angle and the second phase-shift angle based on the received branch-specific beam weights.

7. The method of claim 2, wherein the obtaining of information indicating a branch-specific phase-shift angle and a branch-specific amplitude comprises the RU:

receiving the first phase-shift angle and the second phase-shift angle for each branch from the BBU over the fronthaul connection, or receiving the branch-specific phase-shift angle and a separation angle between the first and the second phase-shifted signals for each branch from the BBU over the fronthaul connection, and calculating the first and the second phase-shift angle for each branch based on the received branch-specific phase-shift angle and the separation angle.

8. The method of claim 1, wherein the antenna elements of the plurality of antenna branches are arranged in an array, and for a first antenna element of the antenna elements of the plurality of antenna branches that is arranged in an area of a physical edge of the array, attenuating the branch-specific amplitude so that the closer the first antenna element is to the physical edge of the array, the more the branch-specific amplitude is attenuated, and wherein the phase-shifting is performed based on the attenuated branch-specific amplitude.

9. A transmitter operable in a wireless communication network configured for analog beamforming, the transmitter comprising a plurality of antenna branches, each antenna branch comprising an antenna element, the transmitter comprising a processing circuitry and a memory, said memory containing instructions executable by said processing circuitry, whereby the transmitter is operative for, for each antenna branch:

obtaining a first and a second signal of an analog radio signal, the first and the second signal being split from the analog radio signal and the analog radio signal being the same at each of the antenna branches;

obtaining information indicating a branch-specific phase-shift angle and a branch-specific amplitude determined from information identifying a radiation pattern comprising at least two directions for wireless transmission to at least one receiver;

phase-shifting the first signal according to a first phase-shift angle and the second signal according to a second phase-shift angle, the first and the second phase-shift angle being selected so that when the first and the second signals are combined, the combined signal has the branch-specific phase-shift angle and the branch-specific amplitude indicated by the obtained information;

obtaining information on a proportion of desired amplitude control;

depending on the proportion of desired amplitude control, adjusting, for each antenna branch, the first phase-shift angle and the second phase-shift angle so that for full amplitude control, the first and the second phase-shift angle are maintained, and for no amplitude control, the first and the second phase-shift angles are the same as the branch-specific phase-shift angle, and for semi-amplitude control, an angular difference between the first and the second-phase shift angle are lowered;

combining the phase-shifted first and second signals into a combined signal; and transmitting, wirelessly, the combined signal through the antenna element.

10. The transmitter of claim 9, wherein the transmitter is a radio unit (RU) operable in a distributed base station system that further comprises a baseband unit (BBU) interconnected with the RU via a fronthaul connection, and the at least one receiver is one or more wireless devices.

11. The transmitter of claim 10, operative for the obtaining of information indicating a branch-specific phase-shift angle and a branch-specific amplitude by the RU:

obtaining an estimation of a wireless communication channel between the RU and the one or more wireless devices, determining branch-specific beam weights for each antenna branch based on the estimation of the wireless communication channel, and calculating the first phase-shift angle and the second phase-shift angle for each antenna branch based on the determined branch-specific beam weights.

12. The transmitter of claim 10, operative for the obtaining of information indicating a branch-specific phase-shift angle and a branch-specific amplitude by the RU:

receiving, from the BBU over the fronthaul connection, a beamspace representation of an estimation of a wireless communication channel between the RU and the one or more wireless device, determining branch-specific beam weights for each antenna branch based on the received beamspace representation, and calculating the first phase-shift angle and the second phase-shift angle for each antenna branch based on the determined branch-specific beam weights.

13. The transmitter of claim 10, operative for the obtaining of information indicating a branch-specific phase-shift angle and a branch-specific amplitude by the RU:

receiving, from the BBU over the fronthaul connection, beam attributes determined from an estimation of a wireless communication channel between the RU and the one or more wireless device, determining branch-specific beam weights based on the received beam attributes, and calculating the first phase-shift angle and the second phase-shift angle based on the determined branch-specific beam weights.

14. The transmitter of claim 10, operative for the obtaining of information indicating a branch-specific phase-shift angle and a branch-specific amplitude by the RU:

receiving branch-specific beam weights from the BBU over the fronthaul connection, and calculating the first phase-shift angle and the second phase-shift angle based on the received branch-specific beam weights.

15. The transmitter of claim 10, operative for the obtaining of information indicating a branch-specific phase-shift angle and a branch-specific amplitude by the RU:

receiving the first phase-shift angle and the second phase-shift angle for each branch from the BBU over the fronthaul connection, or receiving the branch-specific phase-shift angle and a separation angle between the first and the second phase-shifted signals for each branch from the BBU over the fronthaul connection, and calculating the first and the second phase-shift angle for each branch based on the received branch-specific phase-shift angle and the separation angle.

16. The transmitter of claim 9, wherein the antenna elements of the plurality of antenna branches are arranged in an array, and for a first antenna element of the antenna elements of the plurality of antenna branches that is arranged in an area of a physical edge of the array, the transmitter is operative for attenuating the branch-specific amplitude so that the closer the first antenna element is to the physical edge of the array, the more the branch-specific amplitude is attenuated, and wherein the transmitter is operative for performing the phase-shifting based on the attenuated branch-specific amplitude.

17. A non-transitory computer readable storage medium storing a computer program comprising instructions, which, when executed by processing circuitry of a transmitter of a wireless communication network, configured for analog beamforming, the transmitter comprising a plurality of antenna branches, each antenna branch comprising an antenna element, causes the transmitter to perform the following steps, for each antenna branch:

obtaining a first and a second signal of an analog radio signal, the first and the second signal being split from the analog radio signal and the analog radio signal being the same at each of the antenna branches;

obtaining information indicating a branch-specific phase-shift angle and a branch-specific amplitude determined from information identifying a radiation pattern comprising at least two directions for wireless transmission to at least one receiver;

phase-shifting the first signal according to a first phase-shift angle and the second signal according to a second phase-shift angle, the first and the second phase-shift angle being selected so that when the first and the second signals are combined, the combined signal has the branch-specific phase-shift angle and the branch-specific amplitude indicated by the obtained information;

obtaining information on a proportion of desired amplitude control;

depending on the proportion of desired amplitude control, adjusting, for each antenna branch, the first phase-shift angle and the second phase-shift angle so that for full amplitude control, the first and the second phase-shift angle are maintained, and for no amplitude control, the first and the second phase-shift angles are the same as the branch-specific phase-shift angle, and for semi-amplitude control, an angular difference between the first and the second-phase shift angle are lowered;

combining the phase-shifted first and second signals into a combined signal; and transmitting, wirelessly, the combined signal through the antenna element.

* * * * *